US012596872B2

(12) United States Patent

Yan et al.

(10) Patent No.: US 12,596,872 B2

(45) Date of Patent: Apr. 7, 2026

(54) HOLISTIC EMBEDDING GENERATION FOR ENTITY MATCHING

(71) Applicant: Microsoft Technology Licensing, LLC, Redmond, WA (US)

(72) Inventors: Ji Yan, San Jose, CA (US); Yunpeng Xu, Short Hills, NJ (US); Fancheng Kong, Brooklyn, NY (US); Yan Han, Sunnyvale, CA (US); Rui Kou, San Jose, CA (US); Dawn Banister Woodard, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 18/592,408

(22) Filed: Feb. 29, 2024

(65) Prior Publication Data

US 2025/0278563 A1 Sep. 4, 2025

(51) Int. Cl.
G06F 40/279 (2020.01)
G06N 3/0475 (2023.01)

(52) U.S. Cl.
CPC ......... G06F 40/279 (2020.01); G06N 3/0475 (2023.01)

(58) Field of Classification Search
CPC .... G06F 40/279; G06F 16/383; G06N 3/0475
See application file for complete search history.

(56) References Cited

U.S. PATENT DOCUMENTS

| | | | | | |
|---|---|---|---|---|---|
| 12,130,863 | B1 * | 10/2024 | Nayak | ................. | G06F 18/2148 |
| 2019/0272827 | A1 * | 9/2019 | Vozila | ..................... | G10L 25/51 |
| 2022/0358294 | A1 * | 11/2022 | Huang | ................. | G06F 16/258 |
| 2022/0391591 | A1 * | 12/2022 | Ronen | ................... | G06F 16/345 |
| 2024/0020538 | A1 * | 1/2024 | Socher | ................. | G06F 16/243 |
| 2024/0273291 | A1 * | 8/2024 | Smith | ................... | G06F 16/383 |
| 2024/0311424 | A1 * | 9/2024 | Qian | ..................... | G06F 40/295 |
| 2024/0346060 | A1 * | 10/2024 | Brown | ................ | G06Q 50/163 |
| 2024/0370660 | A1 * | 11/2024 | Cha | ......................... | G06T 11/00 |
| 2024/0386707 | A1 * | 11/2024 | Ungureanu | .......... | G06V 10/761 |
| 2024/0394754 | A1 * | 11/2024 | Mokadam | .......... | G06Q 30/0276 |
| 2025/0077765 | A1 * | 3/2025 | Xu | .......................... | G06F 40/56 |
| 2025/0078200 | A1 * | 3/2025 | Zhang | ...................... | G06T 3/10 |

FOREIGN PATENT DOCUMENTS

| | | | | | |
|---|---|---|---|---|---|
| CN | 110287334 | B | * 12/2023 | ........... | G06F 16/367 |
| CN | 118468868 | A | * 8/2024 | ........ | G06N 30/0464 |
| RU | 2665261 | C1 | * 8/2018 | .......... | G06F 40/169 |
| WO | WO-2018025317 | A1 | * 2/2018 | ............ | G06F 16/00 |
| WO | WO-2018033779 | A1 | * 2/2018 | .......... | G06F 40/295 |
| WO | WO-2022071917 | A1 | * 4/2022 | .......... | G06F 40/205 |
| WO | WO-2025048842 | A1 | * 3/2025 | ............ | G06F 40/58 |

* cited by examiner

*Primary Examiner* — Mohammad K Islam

(74) *Attorney, Agent, or Firm* — Nicholson De Vos Webster & Elliott LLP

(57) ABSTRACT

Embodiments may send input including a standardized attribute and an associated attribute value to a task-agnostic generative large language model (LLM). Embodiments may receive, from the task-agnostic generative LLM, a natural language description of the standardized attribute and associated attribute value. Embodiments may send the natural language description of the standardized attribute and associated attribute value to at least one embedding generator. Embodiments may receive, from the at least one embedding generator, at least one embedding of the natural language description.

20 Claims, 9 Drawing Sheets

Figure 5:
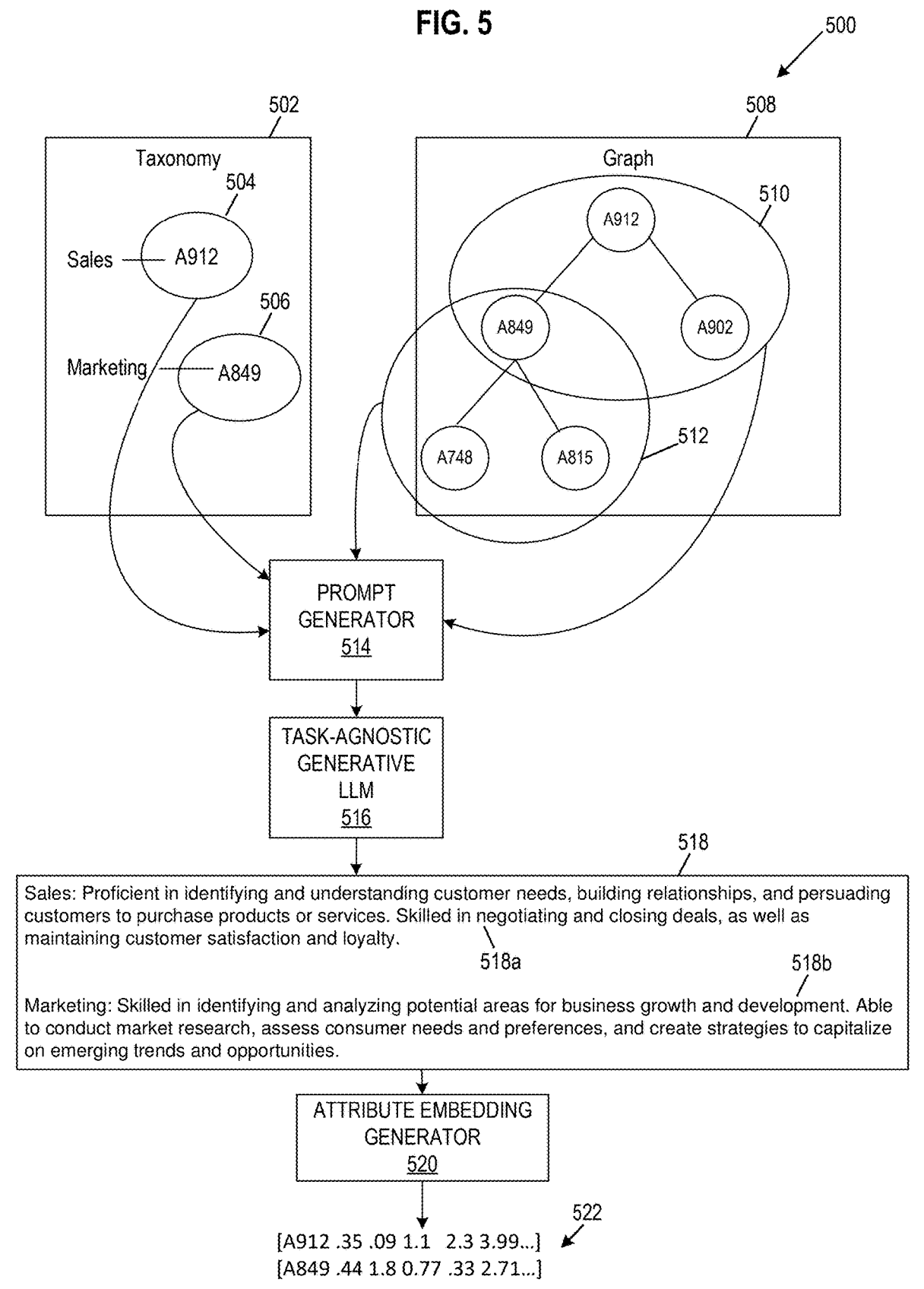

Taxonomy

504

Sales —— A912

506

Marketing —— A849

508

Graph

510

A912

A849     A902

512

A748    A815

PROMPT
GENERATOR
514

TASK-AGNOSTIC
GENERATIVE
LLM
516

518

Sales: Proficient in identifying and understanding customer needs, building relationships, and persuading customers to purchase products or services. Skilled in negotiating and closing deals, as well as maintaining customer satisfaction and loyalty.

518a      518b

Marketing: Skilled in identifying and analyzing potential areas for business growth and development. Able to conduct market research, assess consumer needs and preferences, and create strategies to capitalize on emerging trends and opportunities.

ATTRIBUTE EMBEDDING
GENERATOR
520

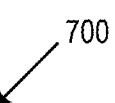

700

Apply An Automated Attribute Extraction Process To A Digital Document Associated With An Entity To Extract, From The Digital Document, A Set Of Standardized Attributes And Associated Attribute Values.

702

Retrieve, From At Least One Data Store, A Set Of Attribute Embeddings Corresponding To The Extracted Set Of Standardized Attributes And Associated Attribute Values.

704

Create An Entity Embedding For The Entity Based On The Set Of Attribute Embeddings.

706

Store The Entity Embedding For Access By An Automated Matching Task.

708

At Least One Attribute Embedding Of The Set Of Attribute Embeddings Is Created Based On A Natural Language Description Generated By A Large Language Model.

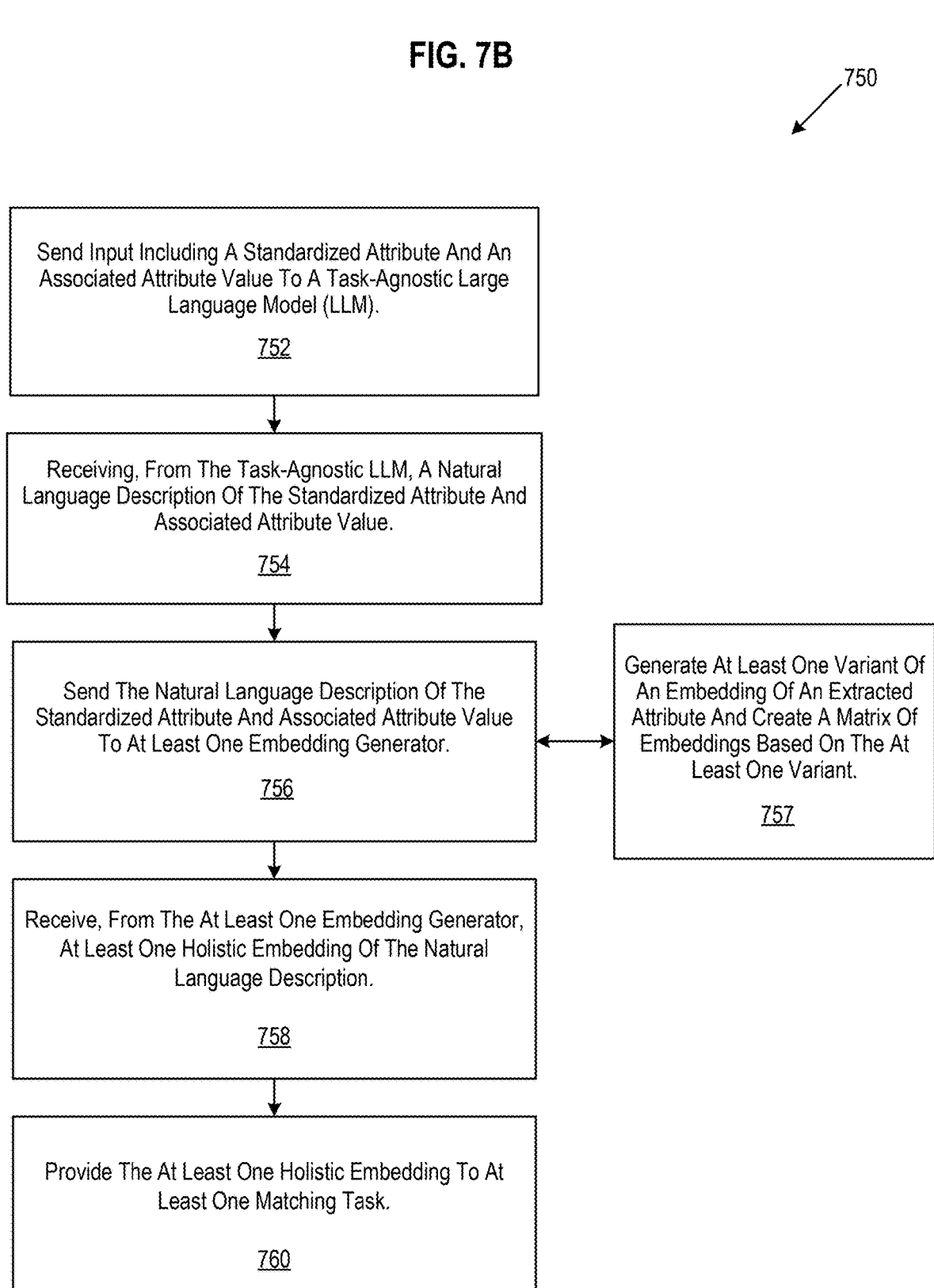

Send Input Including A Standardized Attribute And An Associated Attribute Value To A Task-Agnostic Large Language Model (LLM).

752

Receiving, From The Task-Agnostic LLM, A Natural Language Description Of The Standardized Attribute And Associated Attribute Value.

754

Send The Natural Language Description Of The Standardized Attribute And Associated Attribute Value To At Least One Embedding Generator.

756

Generate At Least One Variant Of An Embedding Of An Extracted Attribute And Create A Matrix Of Embeddings Based On The At Least One Variant.

757

Receive, From The At Least One Embedding Generator, At Least One Holistic Embedding Of The Natural Language Description.

758

Provide The At Least One Holistic Embedding To At Least One Matching Task.

760

HOLISTIC EMBEDDING GENERATION FOR ENTITY MATCHING

TECHNICAL FIELD

A technical field to which this disclosure relates includes entity matching systems.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, consistent with the fair use principles of the United States copyright laws, but otherwise reserves all copyright rights whatsoever.

BACKGROUND

Entity matching systems are automated computer systems that generate predictions as to whether digital entities match each other according to one or more criteria. For example, entity matching systems can be used to predict a likelihood that a job seeker's resume matches the qualifications listed in a job posting, or to predict whether a user is likely to interact with a certain content item if the content item is presented to the user.

Entity matching systems can use artificial intelligence technologies, such as machine learning models, to generate these and/or other types of predictions. Machine learning models are computer-implemented structures that are capable of generating predictive output in response to input. A machine learning model can include a probabilistic or statistical algorithm that is configured to perform a specific predictive function through a training process that involves iteratively exposing the algorithm to many samples of data and adjusting one or more model parameters until the model achieves a satisfactory prediction accuracy and reliability. The predictive accuracy and reliability of a machine learning model in relation to a particular task is dependent upon the training process and the data used in the training.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 5 illustrates an example of attribute embedding generation in accordance with some embodiments of the present disclosure.

FIG. 7A is a flow diagram of an example method for generating entity embeddings using a holistic embedding generator in accordance with some embodiments of the present disclosure.

FIG. 7B is a flow diagram of an example method for generating attribute embeddings using one or more attribute embedding generators in accordance with some embodiments of the present disclosure.

DETAILED DESCRIPTION

Figure 1:
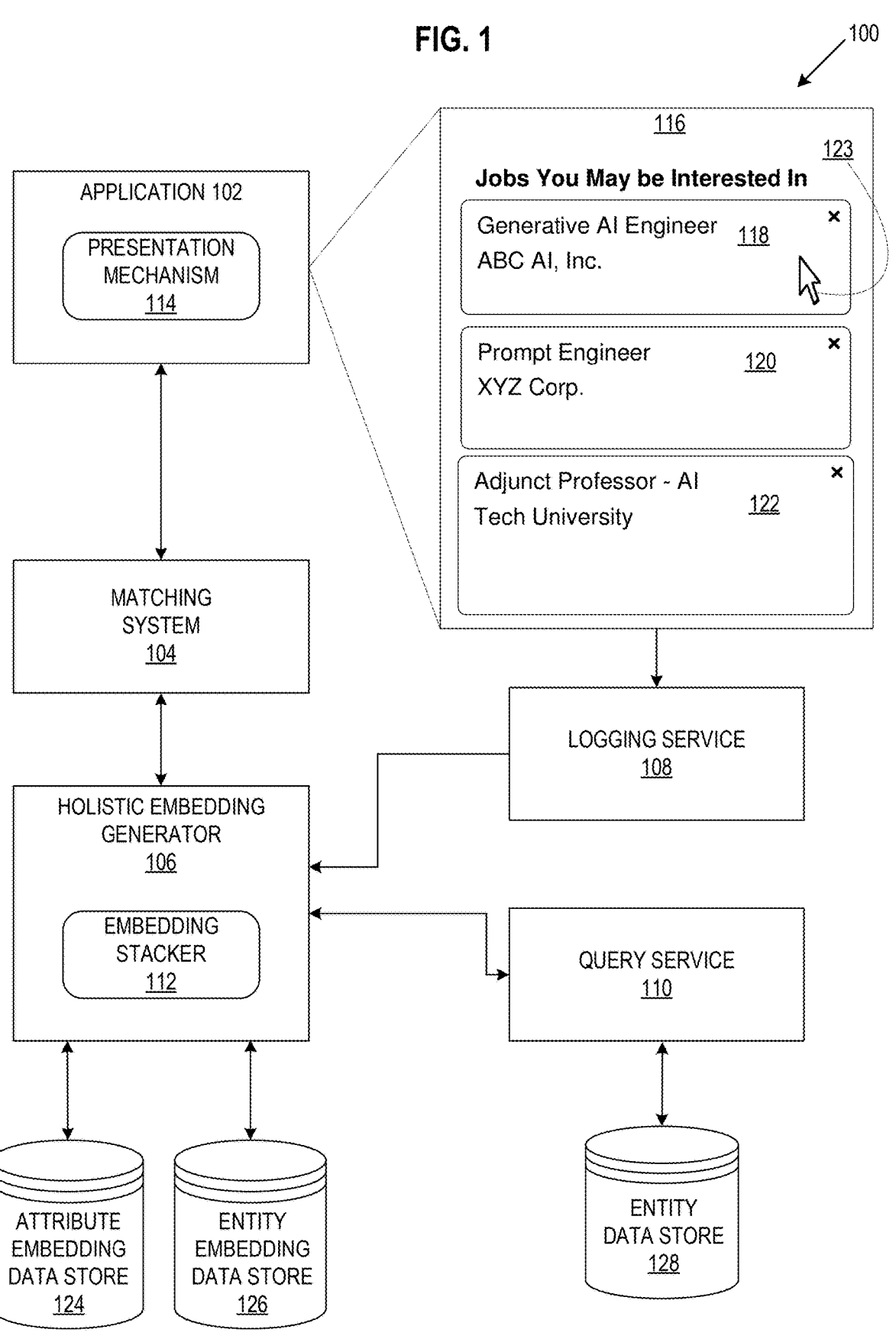
FIG. 1 is a flow diagram of an example method for generating holistic embeddings using a holistic embedding generator in accordance with some embodiments of the present disclosure.

Matching systems can use machine learning models to generate predictions and those predictions can be used to configure one or more downstream operations of an application or online service. For example, matching systems can produce predictive output that can be used to select, rank, or sort digital content items for presentation to users via electronic devices. Examples of downstream operations that can use the predictive output of matching systems include job recommendations, job candidate recommendations, news feeds, automated product recommendations, and automated friend, follower, or connection recommendations for online platforms such as social media services. Other examples include systems that support human decision making, such as systems that use artificial intelligence to generate recommendations for health care, financial services, training, education, and/or other fields or topics. Still other examples include control systems or embedded systems, which may use artificial intelligence to determine courses of action to be executed by other components of automated systems in operational environments, such as "smart" vehicles, appliances, robots, and other automated devices.

Given a pair of entities, match as used herein can refer to a machine-determined predicted or estimated degree of relevance, similarity or compatibility between those entities that satisfies (e.g., meets or exceeds) a threshold level of relevance, similarity or compatibility, where the threshold level of relevance, similarity or compatibility is variable based on the requirements of a particular design or implementation. The threshold level of similarity may be set lower or higher for different types of matching.

Entity as used herein may refer to a user of an application or another type of entity, or to a digital representation of such entity, e.g., a user profile page. Examples of other entity types include companies, organizations, institutions, and digital content items (e.g., videos, articles, posts, comments, shares, or job postings). Data such as skills and job titles are referred to herein using the term attribute rather than entity. This is because certain types of data, such as skills and job titles, are often associated with or dependent upon other types of entities. For instance, job candidates commonly have associated skills and job titles that are listed in their online profiles, and job postings typically contain different sets of associated skills and job titles.

To facilitate entity matching (e.g., matching of jobs to job candidates or users to content items), embeddings can be used as proxies for the raw data, e.g., features, associated with the entities and/or associated attributes for which a match determination is sought. Embedding as used herein may refer to a numerical representation of a set of features. An embedding may encode information, e.g., a set of features, associated with an entity and/or attribute relative to an embedding space. Embeddings and embedding spaces can be generated by artificial intelligence (AI) models. An embedding can be expressed as a vector, where each dimension of the vector includes a numerical value that can be an integer or a real number. The numerical value assigned to a given dimension of the vector conveys information about the data represented by the embedding, relative to the embedding space, also referred to as a vector space. The embedding space (or vector space) includes all of the possible values of each dimension of the vector. The embedding space is defined by the way in which the AI model used to generate the vector has been trained and configured, including the training data used to train the AI model. In some implementations, train as used herein refers to an iterative process of applying an AI algorithm to one or more sets of training data, analyzing the output of the AI model in comparison to expected model output using a loss function (also referred to as a cost function or error function), adjusting one or more parameters and/or coefficients of the AI model, and repeating the process until the difference between the actual model output and the expected model output falls within an acceptable range of error or tolerance.

Embedding-based retrieval (EBR) is a method of searching for similar digital content, such as documents or portions of documents. Embedding-based retrieval involves converting digital data, e.g., sets of features, to embeddings and then using a similarity algorithm, such as nearest-neighbor search or cosine similarity, to identify embeddings that are similar to one another.

In matching systems, EBR can be used to search for, identify, and retrieve matching entities. For example, embeddings can be generated for entities such as users and jobs, and then EBR can be used to identify pairs of matching user and job entities based on the respective embeddings. Prediction accuracy is a crucial component of the output of a matching system. Low or unreliable prediction accuracy can have adverse consequences ranging from the display of irrelevant, inappropriate, or unhelpful information to users of an online system to sub-optimal operational decisions of an automated system due to inaccurate match predictions.

In EBR-based systems, the quality of the embeddings and the processes used to generate the embeddings are determinants of match prediction accuracy. Embeddings that do not accurately represent the features of an entity that are important predictors for a specific task will not produce optimal match predictions. For example, conventional embeddings used to match jobs with job seekers may only represent a limited set of features of those entities, such as skills and job titles. However, match predictions can be improved if the embeddings are capable of encompassing additional features such as geographic location, task-specific attribute descriptions, and/or information about relationships between different entities and attributes.

In some prior applications, relationships between entities and attributes are tracked using one or more graphs. For example, in job-to-job candidate matching applications, relationships between jobs (entities) and skills (attributes)

can be modeled via edges that connect job entities with skill attributes and associated attribute values in the graph. Similarly, relationships between job candidates and skills can be modeled via edges that connect job candidate entities with skill attributes and associated attribute values in the graph. As another example, relationships between different attributes and/or attribute values can be modeled using a graph. For instance, a skill can be linked with a job title (e.g., Python and software engineering), and/or different skills can be linked with each other (e.g., artificial intelligence and machine learning), in the graph.

In some prior applications, attributes and attribute values are standardized and maintained using, e.g., a taxonomy or ontology. For example, a prior application may define a set of standardized attributes as including job title and skill, and for each attribute, a set of standardized attribute values (e.g., job title: software engineer, data scientist; skill: Java, Python). While sets of standardized attributes and attribute values are useful for data consistency, such standardization can negatively impact match prediction accuracy.

One reason for the sub-optimal performance of conventional taxonomy-based embeddings is that the matching accuracy is constrained by the attribute standardization. For instance, a job seeker whose profile includes the skill of machine learning might not be matched with a job posting that lists the skill of neural networks, if either of those skills does not match a standardized attribute in the taxonomy.

Still another limitation of the conventional standard embeddings is that they do not account for task-specific downstream objectives. For instance, considering a specific task or application objective, the matching criteria may be more or less stringent, or the set of relevant attributes may be larger or smaller, depending upon whether the downstream objective is, e.g., feed ranking, job recommendations, or connection recommendations.

To address these and other technical challenges, the described approaches generate holistic entity embeddings based on task-aware attribute embeddings, where the attribute embeddings are in turn generated based on natural language text instead of just the standardized attribute and associated attribute value, alone. In some embodiments, the natural language text that forms the basis of the attribute embedding is machine-generated by a generative large language model (LLM). In some embodiments, the descriptive natural language text is machine-generated in a task-aware way. For instance, task-specific information is included in an instruction provided to a generative large language model used to generate the natural language text from which the embedding is created.

The described approaches overcome the disadvantages of the prior methods and improve entity matching by, in various embodiments, incorporating task-specific signals into the embedding generation process, by using a generative large language model to generate natural language descriptions based on standardized attributes and attribute values and using the LLM-generated natural language descriptions to generate embeddings, and/or by using one or more task-aware large language models to generate multiple different variant embeddings for a single attribute-attribute value pair. In some embodiments, the task-aware attribute embeddings are combined to create a compact, holistic entity embedding for an entity.

Using the described techniques results in more robust entity and attribute embeddings through the use of a generative large language model to expand the standardized attribute-attribute value pairs to fuller, potentially task-aware natural language descriptions, and through the use of one or more task-aware large language models to generate multiple different variant embeddings for each attribute-attribute value pair.

A generative artificial intelligence (GAI) model, generative large language model, or generative model uses artificial intelligence technology, e.g., neural networks, to machine-generate new digital content based on model inputs and the previously existing data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model is a particular type of GAI model that is capable of generating new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input. The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of language model that is trained in an unsupervised way on massive amounts of unlabeled data, such as publicly available texts extracted from the Internet, using deep learning techniques. A large language model can be configured to perform one or more generative and/or discriminative natural language processing (NLP) tasks, such as generating text, classifying text, answering questions in a conversational manner, and translating text from one language to another. That is, some LLMs can be used as a generative model or as a discriminative model.

A large language model includes one or more neural network-based machine learning models. In some implementations, a large language model is constructed using a neural network-based deep learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a pre-processor, the embeddings are input to the neural network model, and the neural network model generates output based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NLP) models. In some examples, the neural network-based machine learning model architecture includes or is based on one or more predictive text neural models that can receive text input and generate one or more outputs based on processing the text with one or more neural network models. Examples of predictive neural models include, but are not limited to, GPT, BERT, and/or Recurrent Neural Networks (RNNs). In some examples, one or more types of neural network-based machine learning model architectures include or are based on one or more multi-modal neural networks capable of outputting different modalities (e.g., text, image, sound, etc.) separately and/or in combination based on textual input. Accordingly, in some examples, a multimodal neural network implemented in the holistic embedding generator is capable of outputting digital content that includes a combination of two or more of text, images, video or audio.

In some implementations, a large language model is trained on a large dataset of digital content such as natural language text, images, videos, audio files, or multi-modal data sets. For example, training samples of digital content such as natural language text extracted from publicly available data sources are used to train one or more generative models used by the holistic embedding generator. The size and composition of the datasets used to train one or more models can vary according to the requirements of a particular design or implementation. In some implementations, one or more of the datasets used to train one or more models includes hundreds of thousands to millions or more different training samples.

In some embodiments, one or more models used by the holistic embedding generator include multiple generative models trained on differently sized datasets. For example, a holistic embedding generator can include a comprehensive but low capacity generative model that is trained on a large data set, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models used by the holistic embedding generator. In reinforcement learning, ground-truth examples of desired model output are paired with respective inputs, and these input-example output pairs are used to train or fine tune one or more models.

Large language models have technical challenges including hallucination and latency. In artificial intelligence, a hallucination is often defined as model output, e.g., generated content, that diverges from the model input, e.g., is nonsensical, incorrect, or unrelated to the provided input. If the model input is not clearly defined or is repetitive, the risk of AI hallucination increases. Additionally, large language models consume large amounts of computing resources and as such can introduce nontrivial amounts of latency into the information retrieval pipeline. As a result of these and other concerns, it is a technical challenge to incorporate the use of LLMs and/or other GAI models into the operational flows of an embedding generator while mitigating the risks of, e.g., AI hallucination and latency.

Another technical challenge is how to scale a holistic embedding generator to a large number of entities (e.g., hundreds of thousands to millions or more users of an Internet-based application system) without needing to increase the size of the system linearly.

To address these and other technical challenges, embodiments of the disclosed technologies provide GAI models with instructions (e.g., statements, questions, examples, conditions, and/or constraints) that are tailored to cause the GAI model to perform a specific task based on a specific set of inputs and/or to cause the GAI model to avoid performing other tasks that could result in hallucination and/or increased latency.

Alternatively or in addition, embodiments dynamically manage communications with the one or more GAI models to address latency and/or other performance issues associated with a computing system or network. For example, the disclosed technologies may use the GAI model selectively only to perform selected tasks, and may use other types of models to perform certain tasks when the latency or hallucination risk associated with the GAI model is high.

Certain aspects of the disclosed technologies are described in the context of generative artificial intelligence models that receive text input and output text. However, the disclosed technologies are not limited to generative models that receive text input and produce text output. For example, aspects of the disclosed technologies can be used to receive input and/or generate output that includes non-text forms of content, such as digital imagery, videos, multimedia, audio, hyperlinks, and/or platform-independent file formats.

Prompt as used herein may refer to one or more instructions that are readable by a GAI model, along with the input to which the GAI model is to apply the instructions, and a set of parameter values that constrain the operations of the GAI model during the processing of the prompt and generating and outputting a response to the prompt. The input can include user input and/or other data. The input can be specified explicitly in the prompt or as a reference that is processed at execution time. As used herein, the instructions can include one or more statements, questions, conditions, constraints, or examples. The examples can include examples of the types of output to be produced by the GAI model and/or examples of the types of processing steps the large language model is to perform in order to generate output. The parameter values contained in the prompt can be specified by the GAI model and may be adjustable in accordance with the requirements of a particular design or implementation. Examples of parameter values include the maximum length or size of the prompt and the temperature, or degree to which the model produces deterministic output versus random output. The way in which the elements of the prompt are organized and the phrasing used to articulate the prompt elements can significantly affect the output produced by the GAI model in response to the prompt. For example, a small change in the prompt content or structure can cause the GAI model to generate a very different output.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

FIG. 1 is a flow diagram of an example method for generating holistic embeddings using a holistic embedding generator in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a holistic embedding generator, including, in some embodiments, components or flows shown in FIG. 1 that may not be specifically shown in other figures and/or including, in some embodiments, components or flows shown in other figures that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 1, the method is performed by an example computing system 100, which includes an example holistic embedding generator 106. In the example of FIG. 1, the components of the holistic embedding generator are implemented using an application server or server cluster, which can include a secure environment (e.g., secure enclave, encryption system, etc.) for the processing of data. In some implementations, one or more components of the holistic embedding generator are implemented on a client device, such as a user system 610, described herein with reference to FIG. 6, running an application 102, alone or in combination with one or more servers. For example, some or all of holistic embedding generator is implemented directly on the user's electronic device in some implementations, thereby avoiding the need to communicate with servers over a network such as the Internet. In some implementations, the holistic embedding generator is in bidirectional communication with one or more applications, e.g., application 102, via a computer network. The one or more applications include front end user interface functionality that, in some embodiments, is considered part of or is in communication with holistic embedding generator 106.

In the embodiment of FIG. 1, the computing system 100 includes application 102, a matching system 104, holistic embedding generator 106, a logging service 108, a query service 110, an attribute embedding data store 124, an entity embedding data store 126, a source entity data store 128, and a target entity data store 130. Additional structural details of example embodiments of each of application 102, matching system 104, holistic embedding generator 106, logging service 108, query service 110, attribute embedding data store 124, entity embedding data store 126, source entity data store 128, and target entity data store 130 are described below, including with reference to FIG. 6.

Application 102 includes a presentation mechanism 114. In operation, presentation mechanism 114 causes presentation of output, including output generated via matching system 104. In the example of FIG. 1, the presentation is in the form of a visual display 116, e.g., a feed, an inbox or a notification list, but other implementations are possible. The display (or other form of presentation) 116 contains one or more presentation positions at which digital entities, such as recommendations, user profiles, job postings, articles, posts, and/or other types of content items, can be presented to the user of application 102. In the example of FIG. 1, the visual display 116 includes a set of job recommendations. Entity 118 includes a job posting presented at a first position, entity 120 includes a different job posting presented at a second position different from the first position, and entity 122 includes still another job posting presented at a third position different from the first and second positions. The number of available presentation positions can vary based on the requirements or design of the application 102 or the specific task (e.g., the task of generating job recommendations), and/or can be constrained by one or more aspects of the computing environment and/or other factors. For example, a mobile device environment with a relatively small display screen may have fewer available positions than a laptop or desktop environment having a larger display screen. As another example, a message inbox may have more available positions than a notification center or a list presented via machine-generated audio. The assignment of content items to positions can be based on output generated via matching system 104 using embeddings generated by holistic embedding generator 106.

The logging service 108 logs signals that are received from the application 102 and/or from the presentation mechanism 114, as the user interacts with the display (or other presentation mechanism) 116. For example, the user may activate a selection mechanism 123 at the first position to view the entity 118 or the user may scroll through the presented entities without selecting any entities. Logging service 108 tracks signals by entity. For instance, if the user selects entity 118, logging service 108 may log [0, 1], indicating that a positive signal was received for the entity 118. If instead the user keep scrolling past entity 118 without selecting entity 118, logging service 108 may log [0,0], indicating that a negative signal or no signal was received for the entity. Logging service 108 continues to log these and other types of online activity signals throughout the user's login session and, in some cases, across multiple user sessions.

Logging service 108 generates an interaction log such as the example described above for each session of each user of application 102. As such, an interaction log can contain any amount of interaction data collected over a time interval of any duration for any number of users. For example, an interaction log can contain information about the specific application, or downstream objective (e.g., job search, people search, online learning, etc.) and/or the operational context, e.g., computing environments, associated with the interaction data, such as whether the interaction occurred on a mobile device or larger computer, or whether the interaction occurred within a browser version of the application 102 or a mobile "app" version of the application 102. As such, the interaction data can be grouped or filtered by one or more contextual or computing environment parameters. From time to time, as described in more detail below, holistic embedding generator 106 obtains interaction data from logging service 108.

In operation, matching system 104 generates and supplies predictive output, such as matching scores, to application 102. Presentation mechanism 114 assigns entities to presentation positions of the display (or other presentation mechanism) 116 based on the matching scores generated by matching system 104. The assignment of entities to presentation positions is on one-to-one basis in that an entity is assigned to only one presentation position at a time, and a presentation position has only one assigned entity at a time.

To generate the matching scores, matching system 104 uses embeddings generated by holistic embedding generator 106. Holistic embedding generator 106 generates holistic embeddings for entities using the techniques described herein. Some embodiments of holistic embedding generator 106 include an embedding stacker 112. Embedding stacker 112 can, for example, stack variant embeddings of an attribute description in a single matric to form a holistic yet compact representation of the attribute description. As described in more detail below with reference to FIG. 3, for a given attribute description, the resulting attribute embedding can include the output of a single attribute embedding generator or can include a combination of output of multiple embedding generators. Alternatively or in addition, as described in more detail below with reference to FIG. 4, embedding stacker 112 can stack attribute embeddings into a corresponding compact representation such that an attribute embedding contains all of the individual attribute embeddings generated for a specific attribute identifier. For example, a holistic embedding can include all of the attribute associated with a particular attribute identifier.

Entities, such as digital representations of users, jobs, companies, content items, and/or other types of entities, can be supplied to holistic embedding generator 106 via query service 110. Query service 110 is configured to process requests, configure and execute search queries, and retrieve, from one or more searchable data stores (e.g., entity data store 128) sets of features associated with entities for which embeddings may be created by holistic embedding generator 106. Examples of the architecture, training, and use of a holistic embedding generator 106 are described in more detail below with reference to FIG. 2, FIG. 3, FIG. 4, and FIG. 5.

As described in more detail below, embodiments of holistic embedding generator 106 improve upon prior embedding approaches by, for example, using a generative large language model to incorporate task-aware signals into the holistic embeddings and/or using one or more large language models to generate multiple different variants of attribute embeddings.

While this disclosure may refer to matching systems in the context of job seeker-job posting matching and job posting-job candidate matching to illustrate operation of the disclosed approaches, the described embedding generation techniques are not limited in application to matching job seekers with job postings or to matching job postings with job candidates. For example, the disclosed approaches can be used to generate matching scores in many different context, e.g., many different types of entity-entity pairs, including user-user pairs (e.g., for connection recommendations), user-company pairs (e.g., for job recommendations), company-company company recommendations (e.g., for sales or marketing opportunities), user-content item pairs (e.g., for feed recommendations or online learning recommendations) and so on.

In some embodiments, the holistic embedding generator 106 pre-computes entity and/or attribute embeddings and stores the pre-computed entity and/or attribute embeddings in, e.g., attribute embedding data store 124 and entity embedding data store 126, for access by one or more downstream processes, services, applications, models, or components, such as one or more matching systems 104.

In some implementations, the entity and/or attribute embeddings produced via holistic embedding generator 106 are indexed for fast online lookup. For example, at the start of a session (e.g., when a user logs in to application 102), the application 102 in combination with matching system 104 and holistic embedding generator 106 determines one or more contextual characteristics of the user's session (e.g., application type, task, downstream objective, device type, channel, portal, etc.), uses the index to retrieve the corresponding set of embeddings appropriate for the user's then-current computing environment, and uses the retrieved embeddings to generate predictive data, e.g., entity matching scores.

The examples shown in FIG. 1 and the accompanying description above are provided for illustration purposes. This disclosure is not limited to the described examples. Additional or alternative details and implementations are described herein.

Figure 2:
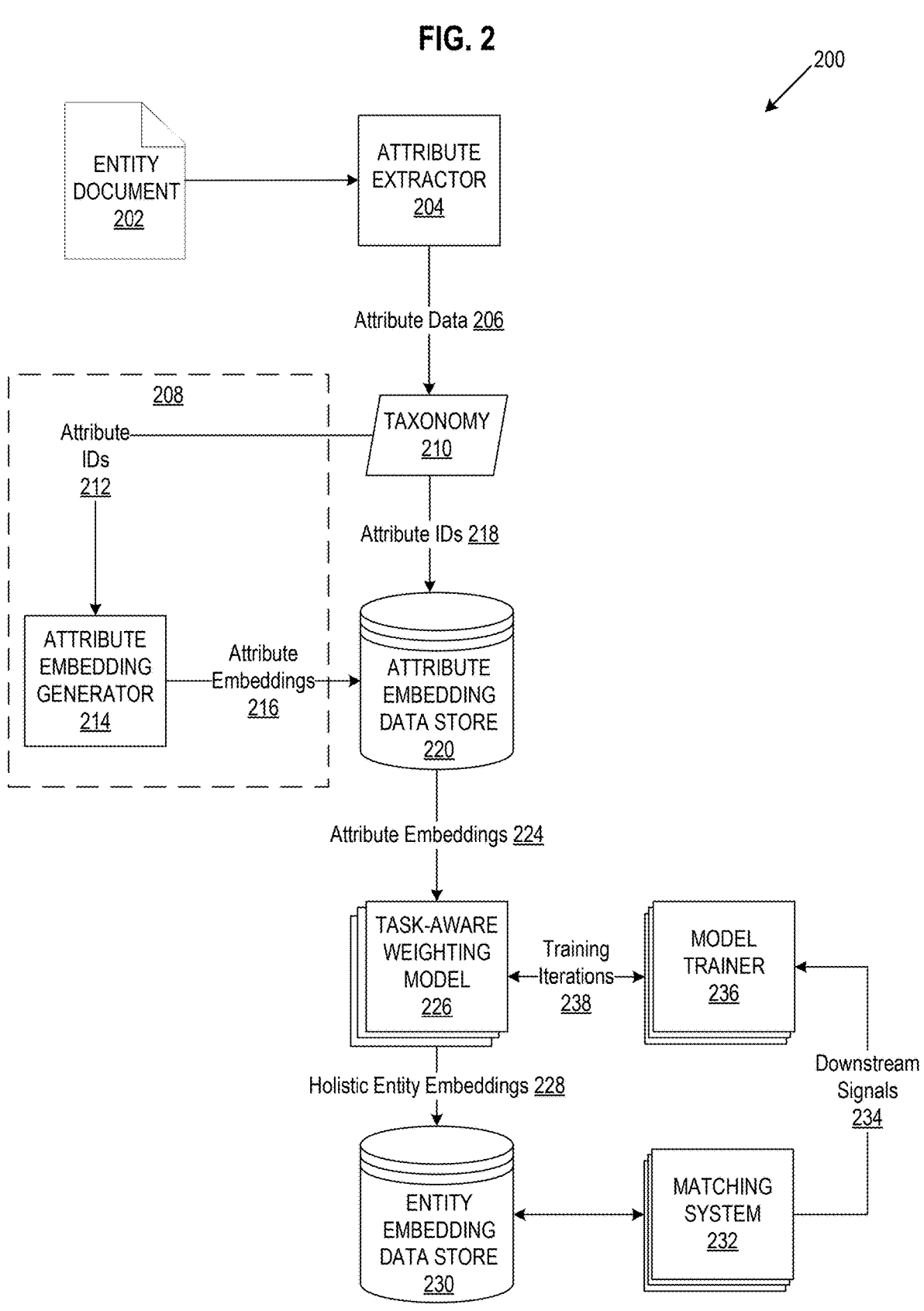
FIG. 2 is a flow diagram of an example method for generating holistic entity embeddings using one or more attribute embedding generators and one or more task-aware weighting models in accordance with some embodiments of the present disclosure.

FIG. 2 is a flow diagram of an example method for generating holistic entity embeddings using one or more attribute embedding generators and one or more task-aware weighting models in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a holistic embedding generator, including, in some embodiments, components or flows shown in FIG. 2 that may not be specifically shown in other figures and/or including, in some embodiments, components or flows shown in other figures that may not be specifically shown in FIG. 2. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 2, an embodiment of a holistic embedding generator 200 includes an attribute extractor 204, a taxonomy 210, an attribute embedding data store 220, one or more task-aware weighting models 226, and an entity embedding data store 230. In some implementations, a matching system 232 and/or a model trainer 236 may be considered part of the holistic embedding generator 200; or, in other implementations, as separate components or services that are in communication with the holistic embedding generator 200.

In operation, the holistic embedding generator 200 identifies attributes contained in an entity document 202, creates one or more attribute embeddings for each identified attribute, and creates an entity embedding based on the one or more attribute embeddings. The holistic embedding generator 200 is capable of processing a large volume (e.g., hundreds of thousands or millions) of entity documents; for example, the holistic embedding generator 200 can be used to generate holistic embeddings for all users of a social network service, for all job postings on a job posting service, for all digital content items shared on a social media platform, etc. For a given entity, the entity embedding generated by holistic embedding generator 200 is a holistic embedding that includes the one or more attribute embeddings. The attribute embeddings and entity embeddings generated by holistic embedding generator 200 are stored for subsequent lookup by, e.g., one or more matching systems 232.

In more detail, entity document 202 is a digital document or set of digital data (e.g., features) associated with an entity. For example, entity document 202 may be a digital version of a resume associated with a job seeker, or an online job posting, or an online user profile, or a company or product web page, or another type of digital content (e.g., multimedia document, video, audio recording, image, graphic, etc.).

Attribute extractor 204 extracts attribute data 206 from entity document 202 in accordance with a taxonomy 210. Attribute extractor 204 applies an automated attribute extraction process to entity document 202 that searches the entity document 202 for unstructured content that matches standardized entities contained in the taxonomy 210. For instance in the example of a user's resume, attribute extractor 204 extracts skills and job titles from the entity document 202, where the skills and job titles correspond to standardized skills and job titles contained in the taxonomy 210. Examples of computer-based tools or utilities that can be used to implement attribute extractor 204 include natural language processing tools such as natural language parsers and named entity recognition (NER) platforms such as GATE or OPENNLP. In some embodiments, a large language model such as a generative pretrained transformer (GPT) model can be instructed or configured to perform entity extraction and therefore function as attribute extractor 204.

Attribute extractor 204 extracts attribute data 206 from entity document 202 and applies taxonomy 210 to the attribute data 206. For example, attribute extractor 204 searches taxonomy 210 for standardized taxonomy entries (where an entry in the taxonomy includes a standardized attribute and associated attribute value) that correspond to the attribute data 206 and outputs the corresponding attribute identifiers (IDs) 218.

The holistic embedding generator 200 searches the attribute embedding data store 220 for attribute embeddings that correspond to the attribute IDs 218. If the attribute embedding data store 220 contains attribute embeddings associated with the attribute IDs 218, the associated attribute embeddings 224 are retrieved and sent, passed or otherwise made available to one or more task-aware weighting models 226.

Figure 3:
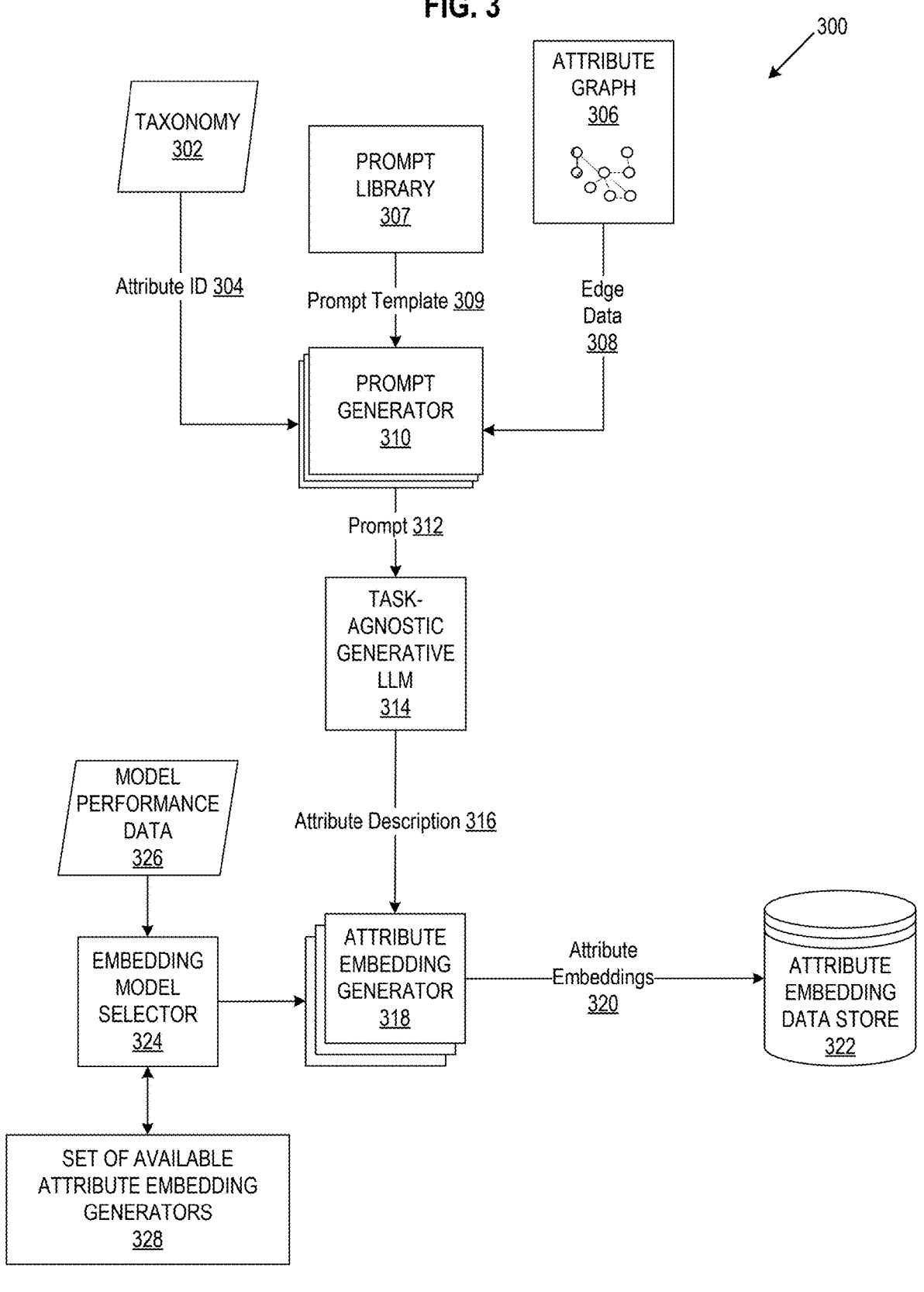
FIG. 3 is a flow diagram of an example method for generating one or more attribute embedding generators and a task-agnostic large language model in accordance with some embodiments of the present disclosure.

If the attribute embedding data store 220 does not contain an attribute embedding associated with an attribute ID 212, then the attribute ID 212 is sent, passed or otherwise made available to an attribute embedding generation component 208. The attribute embedding generation component 208 includes one or more attribute embedding generators 214, and the one or more attribute embedding generators 214 generate and output one or more attribute embeddings 216 for each standardized attribute-attribute value pair extracted from entity document 202. The one or more attribute embeddings 216 are stored in attribute embedding data store 220. An example of attribute embedding generation that may be performed by attribute generation component 208 using the one or more attribute embedding generators 214 is shown in FIG. 3 and described in more detail below.

For instance, as described below with reference to FIG. 3, multiple different attribute embedding generators 214 can be used to generate multiple different attribute embeddings for a single standardized attribute-attribute value pair. As an example, the holistic embedding generator 200 may include or have access to multiple different embedding generators that are each trained or tuned differently, such as a semantic embedding generator and a co-occurrence based embedding generator. The holistic embedding generator 200 can select from among the available different types of attribute embedding generators 214 to generate the attribute embeddings 216 for a given standardized attribute-attribute value pair, such that, for example, both a semantic embedding and a co-occurrence based embedding are generated and stored as attribute embeddings 216.

In some implementations, the taxonomy is omitted such that attribute-attribute value pairs extracted from the entity document 202 are not mapped to standardized attributes and attribute values. In those implementations, attribute embeddings are generated based on the attribute data 206 extracted from the entity document 202 instead of standardized attribute data obtained from taxonomy 210.

To generate a holistic embedding for the entity document 202, the holistic embedding generator 200 combines the individual attribute embeddings 224 (which correspond to attributes extracted from entity document 202) into a single holistic entity embedding 228 for the entity associated with the entity document 202. A task-aware weighting model 226 can be used to assign and/or adjust weights associated with the different attribute embeddings 224 as applicable to a specific task.

For instance, suppose that the attribute-attribute value pairs extracted from entity document 202 include job title: software engineer, skill: machine learning, and skill: project management. The corresponding attribute embeddings 224 are retrieved from attribute embedding data store 220 or generated by attribute embedding generator 214. A task-aware weighting model 226 assigns weights to the attribute embeddings in a task-specific way based on the particular task for which the task-aware weighting model 226 has been trained. For instance, a first task-aware weighting model 226 trained based on a first downstream objective of matching job seekers with job postings assigns a first set of weight values to the attribute embeddings and the combination of the first task-aware weighted attribute embeddings forms a first task-aware entity embedding that includes the attribute embeddings and associated weights based on the first downstream objective. Similarly, a second task-aware weighting model 226 trained based on a second downstream objective of matching users with content items assigns a second set of weight values different from the first set of weight values to the attribute embeddings and the combination of the second task-aware weighted attribute embeddings forms a second task-aware entity embedding that includes the attribute embeddings and associated weights based on the second downstream objective. A task-aware entity embedding can be used as a holistic entity embedding, or the different task-aware entity embeddings can be combined to form a holistic entity embedding. The holist entity embeddings 228 are stored in entity embedding data store 230 for access and use by one or more matching systems 232.

The task-aware weighting models 226 are trained and/or fine-tuned based on downstream signals 234 generated and output by the one or more matching systems 232. For example, in operation, matching system 232 retrieves a pair of entity embeddings from entity embedding data store 230, computes a match prediction score for the entity embedding pair, and determines to present an entity to a user via e.g. presentation mechanism 114 of application 102, based on the match prediction score.

Downstream signals 234 can include user feedback signals such as signals that the user did or did not select or otherwise interact with the presented entity. These downstream signals 234 are sent, passed or otherwise made available to a model trainer 236 associated with the task-aware weighting model 226. The model trainer 236 formulates training data based on the downstream signals 234. To create an instance of training data, the model trainer 236 can, for example, concatenate the downstream signals 234 with the attribute embeddings. The model trainer 236 applies the training data to the task-aware model 226 via one or more training iterations 238. In some embodiments, the model trainer 236 trains one or more of the task-specific weighting models using a distributed gradient.

A similar process may be performed for each task-aware weighting model 226 by its associated model trainer 236 based on downstream signals received from the associated matching system 232. For example, a job-to-job seeker matching system 232 may provide a first set of downstream signals to a first model trainer 236 for tuning of a first task-aware weighting model 226 while a user-to-content item matching system 232 provides a second set of downstream signals to a second model trainer 236 for tuning of a second task-aware weighting model 226. In some implementations, the task-aware weighting models, model trainers, and matching systems are architecturally separate components while in other implementations they may be part of the same architecture. For example, the task-aware weighting models 226 may be implemented as a single multi-task model instead of as multiple separate models, the model trainers 236 may be implemented as a single multi-task model trainer instead of separate model trainers, and the task-specific matching systems 232 may be implemented as a single multi-task matching system instead of as separate matching systems.

As described, the weights applied by a task-aware weighting model across the attribute embeddings 224 associated with a particular entity can be automatically adjusted based on subsequent signals associated with specific downstream objectives. For example, in an entity embedding, a weight value assigned to a particular attribute embedding can be decreased relative to another attribute embedding in the entity embedding, if the downstream signals 234 indicate that the user did not interact with the presented entity, or may be increased if the downstream signals 234 indicate that the user selected and interacted with the presented entity.

The examples shown in FIG. 2 and the accompanying description, above are provided for illustration purposes. This disclosure is not limited to the described examples. Additional or alternative details and implementations are described herein.

FIG. 3 is a flow diagram of an example method 300 for generating one or more attribute embedding generators and a task-agnostic large language model in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a holistic embedding generator, including, in some embodiments, components or flows shown in FIG. 3 that may not be specifically shown in other figures and/or including, in some embodiments, components or flows shown in other figures that may not be specifically shown in FIG. 3. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

In FIG. 3, a portion of a holistic entity embedding generation process is shown. The portion of the holistic entity embedding generation process shown in FIG. 3 is used to generate attribute embeddings that can be combined to form a holistic entity embedding for an entity. For example, the method 300 can be performed by the attribute embedding generation component 208 of FIG. 2.

In FIG. 3, a prompt 312 is generated by prompt generator 310 and input to a generative artificial intelligence model, e.g., a task-agnostic generative LLM 314. The task-agnostic generative LLM 314 processes the prompt 312 to expand a standardized attribute-attribute value pair into a natural language description of the attribute-attribute value pair. The natural language description, e.g., attribute description 316, is used as the input to the attribute embedding generator such that the resulting attribute embedding that is produced by the attribute embedding generator is a vector representation of the natural language description of the attribute-attribute value pair rather than simply a representation of the attribute-attribute value pair by itself.

In the embodiment of FIG. 3, an attribute ID 304 is retrieved from a taxonomy 302. The attribute ID 304 corresponds to a standardized attribute-attribute value pair contained in the taxonomy 302 (e.g., job title: software engineer or skill: machine learning). In other embodiments, the taxonomy may be omitted such that the attribute ID 304 simply acts as a reference identifier for an attribute-attribute value pair (whether standardized or non-standardized) that is associated with an entity (e.g., an attribute and associated attribute value that has been extracted from an entity document 202).

Also in the embodiment of FIG. 3, an attribute graph 306 is accessed to obtain additional contextual information related to the attribute-attribute value pair referenced by the attribute ID 304. Attribute graph 306 is a graph-based representation of attribute data. For example, attribute graph

306 represents attributes and entities, such as users, organizations, and content items, such as documents, as nodes of a graph. Attribute graph 306 represents relationships between entities and/or attributes as edges, or combinations of edges, between the nodes of the graph. Edges can be created based on explicit relationships between entities and/or attributes in the attribute graph 306 and/or implicit relationships between entities and/or attributes, where the implicit relationships are based on, for example, statistics. For instance, a statistical analysis of online interactions between users and job postings can be used to identify or determine implicit relationships between, for example, users and jobs. As an example, a statistical correlation between a skill and a job seeker or between two skills or between a skill and a job posting can be determined based on a history of online interactions of users with various job postings. If a statistical correlation between two entities, or two attributes, or between an entity and an attribute, is higher than a threshold confidence value (e.g., greater than eighty or ninety percent), a link can be implied. If the statistical correlation is lower than the threshold confidence value (e.g., lower than eighty or ninety percent), a link may not be implied based on the statistics.

Portions of attribute graph 306 can be re-generated or updated based on changes and updates to the stored attribute and/or entity data. Also, attribute graph 306 can refer to an entire system-wide graph or to only a portion of a system-wide graph. For instance, attribute graph 306 can refer to a subset of a system-wide graph, where the subset pertains to a particular skill, job title, topic, user or group of users of an application system. In some implementations, attribute graph 306 includes multiple different graphs that are joined by inter-graph edges. For instance, attribute graph 306 can include graphs that have been created across multiple different tasks, downstream objectives, applications or databases.

In the embodiment of FIG. 3, the attribute ID 304 is used to traverse the attribute graph 306 to identify and extract edge data 308 for inclusion in the prompt 312 that is input to the task-agnostic generative LLM 314 to create the attribute description 316. The edge data 308 is identified and obtained by, for example, locating a node of attribute graph 306 that corresponds to the attribute ID 304 and then identifying one or more neighboring nodes that are n-degree connections to that node, where n is a positive integer whose value can be configured based on the requirements or design of a particular implementation. In this way, for example, first- or second-degree relationships of the identified attribute node can be included in the prompt 312 that is generated by prompt generator 310. Edge data 308 can include, for example, attribute-to-attribute edges (e.g., Python as a child skill of programming), entity-to-entity edges (e.g., user clicks on a feed post), and/or entity-to-attribute edges (e.g., skills and job titles associated with user profiles).

The prompt generator 310 formulates prompt 312 to include the attribute data, e.g., attribute ID 304, and the related edge data 308. To formulate prompt 312, in some embodiments, prompt generator 310 configures a pre-existing prompt template 309 obtained from a library of prompt templates, e.g., prompt library 307, by assigning values obtained via attribute ID 304 and/or edge data 308 to one or more arguments or parameters of the prompt template 309. The prompt template 309 can include one or more predefined instructions and/or examples, and/or one or more parameters or arguments for context data. The instructions include statements that instruct the generative LLM 314 to perform certain processing operations on the input. The examples constrain the processing by the generative LLM 314. The context provides input to which the instructions are applied by the generative LLM 314 in accordance with the constraints.

In some implementations, the prompt 312 includes one or more task-specific instructions that are associated with one or more downstream objectives. For example, if a downstream objective is matching job candidates with jobs, the prompt 312 can include a task-specific instruction to cause the generative LLM 314 to act like a job recruiter when generating the attribute description 316. Similarly, if the downstream objective is matching job seekers with job postings, the prompt 312 can include a task-specific instruction to cause the LLM 314 to act like a job seeker when generating the attribute description 316. These and/or other task-specific instructions can be stored in, for example, task-specific prompt templates 309 of prompt library 307.

The task-agnostic generative LLM 314 is a generative AI model that is capable of machine-generating natural language text based on an input, such as prompt 312. For example, task-agnostic generative LLM 314 may be implemented using a general-purpose GPT model that has not been trained or fine-tuned for any particular domain application or downstream objective. The task-agnostic generative LLM 314 generates and outputs attribute description 316 based on and in response to prompt 312. Depending upon the configuration of the prompt 312, the attribute description 316 can be task-agnostic or task-specific. For instance, if the prompt 312 includes a task-specific instruction, then the resulting attribute description 316 generated by the task-agnostic generative LLM 314 may be task-specific, but if the prompt 312 does not include a task-specific instruction, then the attribute description 316 may also be task-agnostic. Examples of attribute descriptions that may be generated by task-agnostic generative LLM 314 are shown in FIG. 5, described below.

The attribute description 316 generated and output by the generative LLM 314 is input to one or more attribute embedding generators 318, which generate and output attribute embeddings 320 based on the attribute description 316. The attribute embeddings 320 are stored in attribute embedding data store 322, from which they may be retrieved to create a holistic entity embedding as described above.

As discussed above, multiple different attribute embedding generators 318 may be used to create multiple different variant embeddings for the attribute description 316. For example, a semantic embedding generator may generate and output a semantic embedding based on the attribute description 316 while a co-occurrence based embedding generator may generate and output a different, co-occurrence based embedding based on the same attribute description 316. In some implementations, these variant embeddings of the attribute description 316 can be stacked in a single matric to form a holistic yet compact representation of the attribute description 316. Thus, for a given attribute description 316, the resulting attribute embedding 320 can include the output of a single attribute embedding generator 318 or can include a combination of output of multiple embedding generators 318.

To create an attribute embedding, an attribute embedding generator 318 applies an embedding function to the attribute description 316. The embedding function is implemented using, for example, a pre-trained transformer-based machine learning model, such as a BERT (Bidirectional Encoder Representations from Transformers) deep learning model, in some embodiments, but other types of embedding functions may be used.

In the embodiment of FIG. 3, an embedding model selector 324 automates the process of selecting attribute embedding generators 318. The embedding model selector 324 is implemented, for example, as a rules engine that selects, e.g., the top k attribute embedding generators 318 (where k is a positive integer configurable based on the requirements of a particular design or implantation) from a set of available attribute embedding generators 328 based on model performance data 326. Model performance data 326 includes, for example, machine learning model performance metrics such as precision, recall, confidence values, and/or f1 scores, for each of the available attribute embedding generators 328. The rules engine of the embedding model selector 324, including thresholds for selecting and/or deselecting particular embedding generators can be configured based on the requirements or design of a particular implementation.

The examples shown in FIG. 3 and the accompanying description, above are provided for illustration purposes. This disclosure is not limited to the described examples. Additional or alternative details and implementations are described herein.

Figure 4:
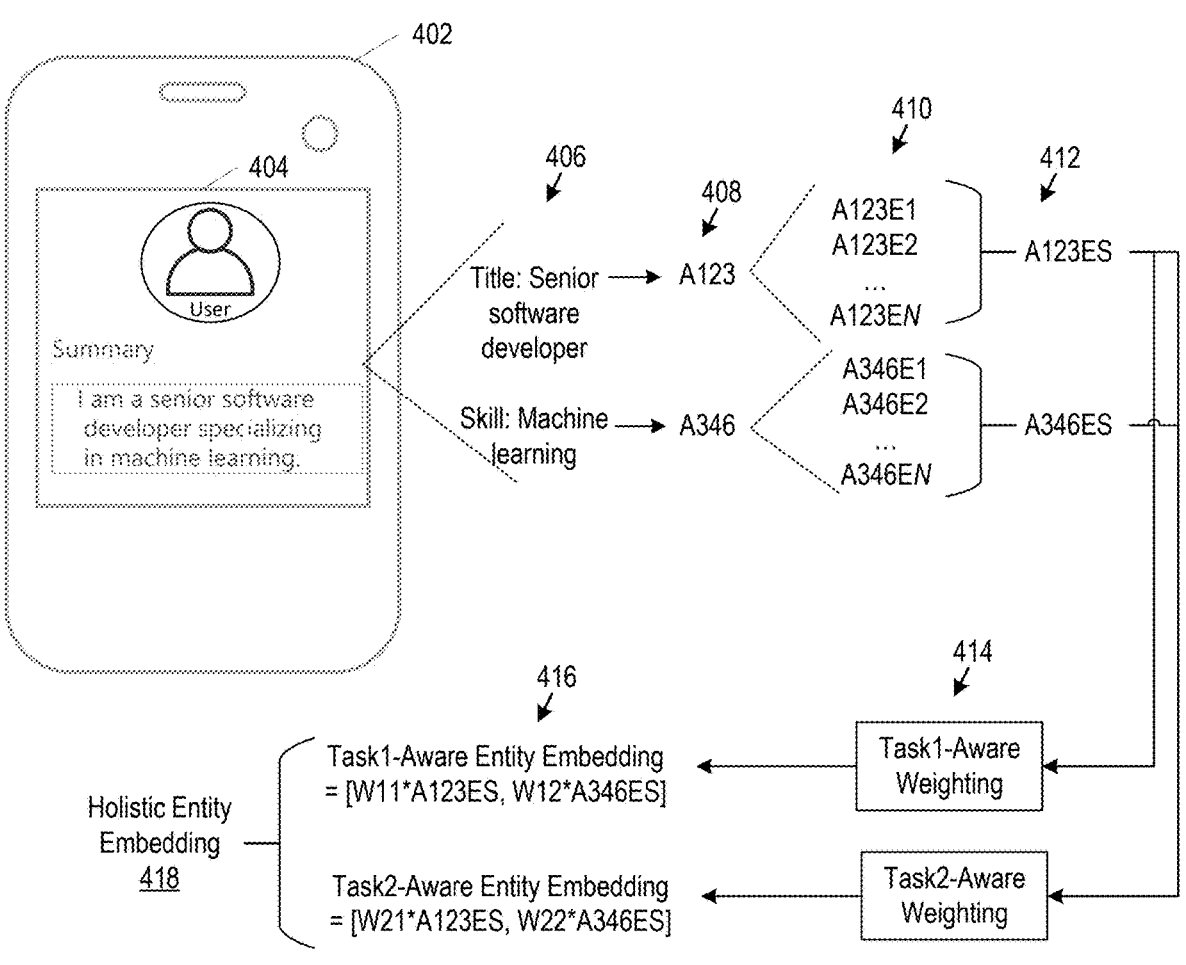
FIG. 4 illustrates an example of a holistic entity embedding generation in accordance with some embodiments of the present disclosure.

FIG. 4 illustrates an example of a holistic entity embedding generation process in accordance with some embodiments of the present disclosure.

In FIG. 4, a flow 400 includes a computing device 402, which displays a user profile 404. Referring to FIG. 2, the user profile 404 can be considered as an entity document 202. The user profile 404 contains an unstructured natural language summary (e.g., "I am a senior software developer . . . "). In the flow 400, an entity extraction process executed by, e.g., attribute extractor 204, identifies and extracts attribute-attribute value pairs 406 (e.g., job title: senior software developer and skill: machine learning) from the user profile 404. The extracted attribute-attribute value pairs are mapped to attribute identifiers 408 in a taxonomy (e.g., taxonomy 210). For example, A123 uniquely identifies the attribute-attribute value pair title: senior software developer and A346 uniquely identifies the attribute-attribute value pair skill: machine learning in the taxonomy.

Continuing the flow 400, one or more attribute embeddings 410 are generated for each of the attribute identifiers 408 using, e.g., one or more embedding generators 214 and/or attribute embedding generation processes 300, described above. For example, a first set of attribute embeddings 410 generated for the attribute-attribute value pair represented by the attribute identifier A123 includes attribute embeddings A123E1, A123E2, . . . A123EN, where N is a positive integer. Similarly, a second set of attribute embeddings 410 generated for the attribute-attribute value pair represented by the attribute identifier A346 includes attribute embeddings A346E1, A346E2, . . . A346EN, where N is a positive integer.

In embodiments where multiple attribute embeddings 410 are generated for a single attribute identifier 408, each of the different attribute embeddings 410 can be generated by a different embedding generator. For instance, attribute embeddings A123E1 and A346E1 could be generated using a semantic embedding generator while attribute embeddings A123E2 and A346E2 are generated using a co-occurrence based embedding generator, and so on. A process for selecting attribute embedding generators is shown in FIG. 3, described above.

In the example flow 400, for each attribute identifier 408, the resulting one or more attribute embeddings 410 are stacked into a corresponding compact representation 412, such that an attribute embedding 412 contains all of the individual attribute embeddings 410 generated for a specific attribute identifier 408. For example, the compact representation A123ES includes all of the attribute embeddings 410 (e.g., A123E1, A123E2, . . . A123EN) associated with the attribute identifier A123. Similarly, the compact representation A346ES includes all of the attribute embeddings 410 (e.g., A346E1, A346E2, . . . A346EN) associated with the attribute identifier A346.

Also in the flow 400, one or more task-aware models (e.g., task-aware weighting models 226, described above) apply task-aware weightings 414 to the attribute embeddings in the set of attribute embeddings 412 associated with the user profile 404 to form one or more task-aware entity embeddings 416. For example, the entity embedding for the user associated with the user profile 404 includes both of the compact embeddings A123ES and A346ES. A task1-aware weighting model 414 assigns weights to the respective compact embeddings A123ES and A346ES in accordance with a first downstream objective (e.g., a specific match prediction task, such as matching job seekers with job postings).

In the example of FIG. 4, task1-aware weighting 414 assigns a weight value of W11 to the embedding A123ES and a weight value of W12 to the embedding A346ES. The embeddings A123ES, A346ES can be weighted equally or differently depending upon the downstream signals related to the task1 objective. For example, given a downstream objective of matching job seekers with job postings, the weight value of W12 could be set at a higher value that the weight value W11 if the training data for task1-aware weighting 414 (including, e.g., downstream user interaction signals) used to train or tune the task1-aware weighting 414 includes more positive downstream interactions when a job seeker's skills match job posting skills. Alternatively, the weight value of W12 could be set at or to a lower value than the weight value W11 if the training data for task1-aware weighting 414 includes more positive downstream interactions when the job seeker's job title matches the job title of the job posting than when the job seeker's skills match the job posting's skills.

Alternatively or in addition, a task2-aware weighting model 414 assigns weights to the respective compact embeddings A123ES and A346ES in accordance with a second downstream objective that is different from the first downstream objective (e.g., a specific match prediction task, such as matching users with content items).

In the example flow 400 of FIG. 4, task2-aware weighting 414 assigns a weight value of W21 to the embedding A123ES and a weight value of W22 to the embedding A346ES. The embeddings A123ES, A346ES can be weighted equally or differently depending upon the downstream signals related to the task2 objective. For example, given a downstream objective of matching users with content items, the weight value of W22 could be set at a higher value that the weight value W21 if the training data for task2-ware weighting 414 (including, e.g., downstream user interaction signals) used to train or tune the task2-aware weighting 414 includes more positive downstream interactions when a user's skills match skills mentioned in news articles. Alternatively, the weight value of W22 could be set at or to a lower value than the weight value W21 if the training data for task2-aware weighting 414 includes more positive downstream interactions when the user's job title matches the job title of the author of an article than when the user's skills match the skills mentioned in the article.

Also in the flow 400, the resulting one or more task-aware entity embeddings 416 are combined to form a holistic entity embedding 418 for the entity associated with the user profile 404 (e.g., the user described by the profile 404). For example the task-aware entity embeddings 416 are concatenated or stacked in a single matrix to form a compact representation of the holistic embedding 418. The holistic embedding 418 is stored in a data store or otherwise made accessible to one or more downstream processes, models, components, or systems (e.g., a task1-aware match prediction system and/or a task2-aware match prediction system).

In FIG. 4, for clarity and ease of discussion, a limited number of attributes, attribute values, embeddings, and models are shown in the flow 400. Implementations of the flow 400 can include any number of attributes, attribute values, embeddings, and/or models in accordance with the requirements of a particular design or implementation of the holistic embedding generator.

The examples shown in FIG. 4 and the accompanying description, above are provided for illustration purposes. This disclosure is not limited to the described examples. Additional or alternative details and implementations are described herein.

FIG. 5 illustrates an example of attribute embedding generation in accordance with some embodiments of the present disclosure.

In FIG. 5, a flow 500 includes a prompt generator 514, which configures a prompt to cause a generative artificial intelligence model (e.g., task-agnostic generative LLM 516) to expand attribute-related data into natural language descriptions 518 of the attribute data, and then includes the natural language descriptions 518 (alone or in combination with the attribute-related data) in the input to the attribute embedding generator 520 that is used to generate and output attribute embeddings 522.

In the example of FIG. 5, the attribute-related data is obtained from one or more of a taxonomy 502 and a graph 508. The taxonomy 502 maps attribute identifiers with attribute names or attribute-attribute value pairs. For example, the taxonomy 502 includes attribute identifiers 504, 506, which map unique identifiers A912, A849, respectively, to the corresponding attributes (e.g., skills such as sales and marketing). The graph 508 map logical relationships between or among attribute identifiers by using nodes to represent attribute identifiers and edges to define inter-node relationships.

In the example flow 500, attribute identifier data 504, 508 is extracted from taxonomy 502 by, e.g., attribute extractor 204 or attribute embedding generator 214, discussed above. Each extracted attribute identifier is mapped to a node in the graph 508, and a subgraph of the graph 508 is identified for each such node. For example, attribute identifier A912 is extracted from taxonomy 502 and mapped to a corresponding node A912 in the graph 508, and a related subgraph 510 (which includes edge data for the edges connecting node A912 to nodes A849 and A902) is identified for the node A912 using, e.g., a nearest neighbor search algorithm. Similarly, attribute identifier A849 is extracted from the taxonomy 502 and a related subgraph 512 is extracted from the graph 508.

For a given attribute, the attribute data 504, 506 extracted from taxonomy 502 and the corresponding subgraph or edge data 510, 512, as the case may be, are input to prompt generator 514. For a given attribute, prompt generator 514 auto-configures a prompt for input to task-agnostic generative LLM 516. For example, to generate a natural language description 518a for the "sales" attribute, the attribute data 504 and edge data 510 are input to prompt generator 514, and prompt generator 514 configures a prompt based on the inputs 504, 510 alone or in combination with one or more other prompt elements (e.g., few-shot examples, instructions, and/or context) as described above with reference to prompt generator 310 of FIG. 3.

Similarly, to generate a natural language description 518b for the "marketing" attribute, the attribute data 506 and edge data 512 are input to prompt generator 514, and prompt generator 514 configures a prompt based on the inputs 506, 512 alone or in combination with one or more other prompt elements (e.g., few-shot examples, instructions, and/or context) as described above with reference to prompt generator 310 of FIG. 3.

The prompt generator 514 may be considered "task-specific" in that it can configure a prompt for a specific task. For instance, rather than simply instructing the task-agnostic LLM 516 to generate a task-agnostic natural language description based on the inputs 504, 510 or the inputs 508, 512, the prompt generator 514 may configure any prompt in a task-specific way, e.g., based on a downstream objective. For example, to configure a prompt to cause the task-agnostic LLM 516 to generate a natural language description of an attribute that is especially suitable for a downstream objective of matching job seekers with job postings, the prompt generator 514 can select a task-specific prompt template, instruction, or set of examples.

For instance, the prompt generator 514 can configure the prompt to specifically instruct the task-agnostic LLM 516 to assume a specific role, such as the role of a job seeker or a job recruiter. As such, a resulting natural language descriptions 518 generated and output by the task-agnostic LLM 516 may be different than another natural language description 518 for the same attribute inputs, depending on the downstream objective. In other words, the natural language description 518a of the attribute "sales" might be generated by the task-agnostic LLM 516 configured according to the role of a job seeker while a different natural language description of the same attribute (e.g., "sales") might be generated by the task-agnostic LLM 516 according to a different role, such as the role of recruiter.

In the flow 500, for a given attribute, the corresponding natural language description 518 is input to one or more attribute embedding generators 520, along or in combination with the attribute data 504, 506 and/or edge data 510, 512. The one or more attribute embedding generators 520 each generate and output an attribute embedding 522 for that attribute based on the natural language description 518 that has been generated and output by the task-agnostic generative LLM 516 in response to the prompt configured by the prompt generator 514. As discussed above, multiple different embedding generators 520 can be used, in some embodiments (e.g., a semantic embedding generator and a co-occurrence based embedding generator). For ease of discussion, FIG. 5 shows only one attribute embedding generator 520. The output of attribute embedding generator 520 is, for each set of attribute inputs (e.g. natural language description 518 alone or in combination with attribute data 504, 506 and/or edge data 510, 512), a corresponding embedding, e.g., a vector representation of the attribute inputs. For example, an embedding 522 for attribute A912 and a different embedding for the attribute A849 are created by attribute embedding generator 520. In embodiments that use multiple embedding generators 520, the attribute inputs (e.g. natural language description 518 alone or in combination with attribute data 504, 506 and/or edge data 510, 512) are input to each of the selected embedding generators and each embedding generator generates a separate, respective attribute embedding based on the attribute inputs; these attribute-specific embeddings can be combined into a compact embedding representation of the attribute using stacking, as described above.

In FIG. 5, for clarity and ease of discussion, a limited number of attributes, attribute values, embeddings, and models are shown in the flow 500. Implementations of the flow 500 can include any number of attributes, attribute values, embeddings, and/or models in accordance with the requirements of a particular design or implementation of the holistic embedding generator.

The examples shown in FIG. 5 and the accompanying description, above are provided for illustration purposes. This disclosure is not limited to the described examples. Additional or alternative details and implementations are described herein.

Figure 6:
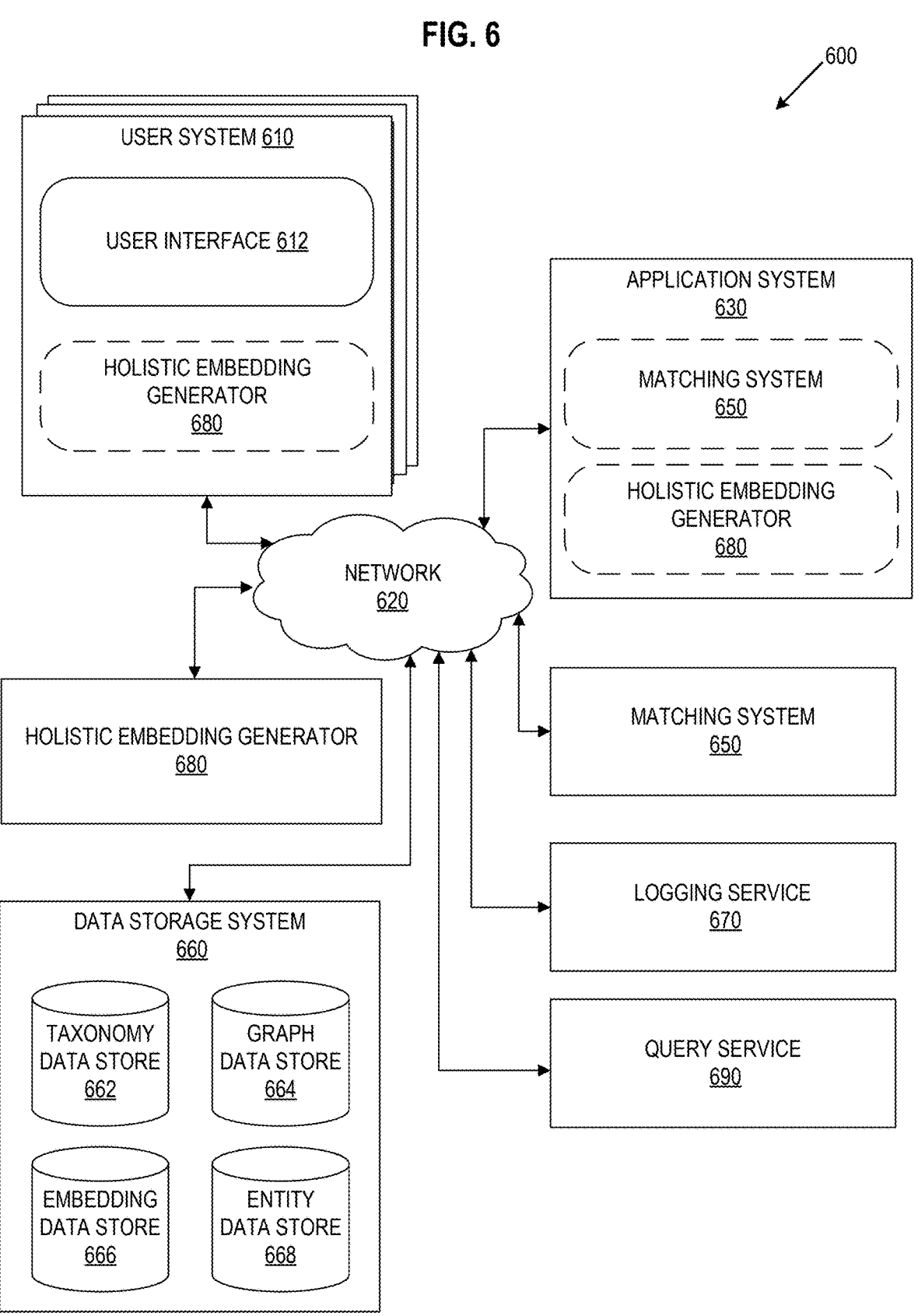
FIG. 6 is a block diagram of a computing system that includes a holistic embedding generator in accordance with some embodiments of the present disclosure.

FIG. 6 is a block diagram of a computing system that includes a holistic embedding generator in accordance with some embodiments of the present disclosure.

In the embodiment of FIG. 6, a computing system 600 includes one or more user systems 610, a network 620, an application system 630, a matching system 650, a holistic embedding generator 680, a data storage system 660, an event logging service 670, and a query service 690. Embodiments of holistic embedding generator 680 include components shown in and described herein, for example components of one or more of FIG. 1, FIG. 2, FIG. 3, FIG. 4, or FIG. 5. Holistic embedding generator 680 includes one or more artificial intelligence-based models, such as discriminative and/or generative models, neural networks and/or other types of machine learning-based models, probabilistic models, statistical models, transformer-based models, and/or any combination of any of the foregoing. Holistic embedding generator 680 accesses these models, for example via one or more application programming interfaces (API) and/or other communication mechanisms. Holistic embedding generator 680 can include automated or semi-automated machine learning-based training and model validation services. Holistic embedding generator 680 can include one or more monitoring services that periodically generate, publish, or broadcast latency, accuracy, reliability, and/or other performance metrics associated with one or more of the machine learning models. For example, holistic embedding generator 680 can provide a set of APIs that can be used to obtain performance metrics for one or more machine learning models of the holistic embedding generator 680.

All or at least some components of holistic embedding generator 680 are implemented at the user system 610, in some implementations. For example, portions of holistic embedding generator 680 are implemented directly upon a single client device such that communications involving applications running on user system 610 and holistic embedding generator 680 occur on-device without the need to communicate with, e.g., one or more servers, over the Internet. Dashed lines are used in FIG. 6 to indicate that all or portions of holistic embedding generator 680 can be implemented directly on the user system 610, e.g., the user's client device. In other words, both user system 610 and holistic embedding generator 680 can be implemented on the same computing device, in some implementations. In other implementations, all or portions of holistic embedding generator 680 are implemented on one or more servers and in communication with user systems 610 via network 620. Components of the computing system 600 including the holistic embedding generator 680 are described in more detail herein.

A user system 610 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 610 can be connected to network 620 at the same time or at different times. Different user systems 610 can contain similar components as described in connection with the illustrated user system 610. For example, many different end users of computing system 600 can be interacting with many different instances of application system 630 through their respective user systems 610, at the same time or at different times.

User system 610 includes a user interface 612. User interface 612 is installed on user system 610 or accessible to user system 610 via network 620. Embodiments of user interface 612 include a front end portion of application system 630, e.g., presentation mechanism 114.

User interface 612 includes, for example, a graphical display screen that includes graphical user interface elements such as at least one input box or other input mechanism and at least one slot (also referred to as a position or card). A slot as used herein refers to a space or location on a graphical display such as a web page or mobile device screen, into which digital content such as documents, search results, recommendations, feed items, chat boxes, or threads, can be loaded for display to the user. For example, user interface 612 may be configured with a scrollable arrangement of variable-length slots that simulates an online chat or instant messaging session and/or a scrollable arrangement of slots that contain search results and/or recommendations, such as a vertical and/or horizontal feed. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system.

User interface 612 can be used to interact with one or more application systems 630. For example, user interface 612 enables the user of a user system 610 to browse a feed, notification list, set of recommendations, or search results, or to create, edit, send, view, receive, process, and organize search queries, search results, content items, and/or portions of online dialogs. In some implementations, user interface 612 enables the user to input requests (e.g., queries) for various different types of information, to initiate user interface events, and to view or otherwise perceive output such as data and/or digital content produced by, e.g., an application system 630 or holistic embedding generator 680. For example, user interface 612 can include a graphical user interface (GUI), a conversational voice/speech interface, a virtual reality, augmented reality, or mixed reality interface, and/or a haptic interface. User interface 612 includes a mechanism for entering search queries and/or selecting search criteria (e.g., facets, filters, etc.), selecting GUI user input control elements, and interacting with digital content such as search results, entity profiles, posts, articles, feeds, and online dialogs. Examples of user interface 612 include web browsers, command line interfaces, and mobile app front ends. User interface 612 as used herein can include application programming interfaces (APIs).

Network 620 includes an electronic communications network. Network 620 can be implemented on any medium or mechanism that provides for the exchange of digital data, signals, and/or instructions between the various components of computing system 600. Examples of network 620 include, without limitation, a Local Area Network (LAN), a Wide Area Network (WAN), an Ethernet network or the Internet, or at least one terrestrial, satellite or wireless link, or a combination of any number of different networks and/or communication links.

Application system 630 can include, for example, one or more online systems that provide job search services, job candidate search services, social media services, general-purpose search engines, specific-purpose search engines, messaging systems, content distribution platforms, e-commerce software, enterprise software, or any combination of any of the foregoing or other types of software. Application system 630 includes any type of application system that provides or enables the retrieval of and interactions with at least one form of digital content, including machine-generated content, via user interface 612. In some implementations, portions of holistic embedding generator 680 are components of application system 630.

In some implementations, a front end portion of application system 630 can operate in user system 610, for example as a plugin or widget in a graphical user interface of a web application, mobile software application, or as a web browser executing user interface 612. In an embodiment, a mobile app or a web browser of a user system 610 can transmit a network communication such as an HTTP request over network 620 in response to user input that is received through a user interface provided by the web application, mobile app, or web browser, such as user interface 612. A server running application system 630 can receive the input from the web application, mobile app, or browser executing user interface 612, perform at least one operation using the input, and return output to the user interface 612 using a network communication such as an HTTP response, which the web application, mobile app, or browser receives and processes at the user system 610.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some implementations, content distribution service 638 is part of application system 630. In other implementations, content distribution service 638 interfaces with application system 630 and/or holistic embedding generator 680, for example, via one or more application programming interfaces (APIs).

Matching system 650 includes one or more entity scoring, ranking, sorting, filtering and/or selection functions. For example, matching system 650 ranks entities, such as jobs, job seekers, job candidates, or content items, based on the embeddings output by holistic embedding generator 680 and then selects the top k items or entities for presentation based on those embeddings, where k is a positive integer that is configurable according to the requirements of a particular design or implementation.

Event logging service 670 captures and records network activity data generated during operation of application system 630, including user interface events generated at user systems 610 via user interface 612 (e.g., via presentation mechanism 114), in real time, and formulates the user interface events and/or other network activity data into a data stream that can be consumed by, for example, a stream processing system. Examples of network activity data include views of content items, logins, page loads, input of search queries or query terms, selections of facets or filters, clicks on recommendations, search results or graphical user interface control elements, scrolling lists of recommendations or search results, and social action data such as likes, shares, comments, and social reactions (e.g., "insightful," "curious," etc.). For instance, when a user of application system 630 via a user system 610 enters input or clicks on a user interface element, such as a content item in a feed, or selects a user interface control element such as a view, comment, share, or reaction button, or uploads a file, or inputs a query, or scrolls through a feed, etc., event logging service 670 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to a display of content, such as a list of recommendations or feed items, event logging service 670 stores the corresponding event data in a log. Event logging service 670 generates a data stream that includes a record of real-time event data for each user interface event that has occurred. Event data logged by event logging service 670 can be pre-processed and anonymized as needed so that it can be used as context data to, for example, configure one or more instructions for one or more artificial intelligence models (e.g., deep learning models), or to modify weights, scores, and/or parameters associated with the holistic embedding generator.

Query service 690 includes an information retrieval system that formulates and executes queries on information stored in one or more data stores, to identify and retrieve information related to one or more search criteria. For example, query service 690 executes searches against one or more user data stores to obtain user features associated with particular users and executes searches against one or more content item data stores to obtain item features associated with particular content items.

Data storage system 660 includes data stores and/or data services that store digital data received, used, manipulated, and produced by application system 630 and/or holistic embedding generator 680, including user inputs, model outputs, weights, parameters, and embeddings.

In the example of FIG. 6, data storage system 660 includes a taxonomy data store 662, a graph data store 664, an embedding data store 666, and an entity data store 668. Taxonomy data store 662 stores data that can be used by holistic embedding generator 680 to generate attribute embeddings or to look up attribute embeddings as described herein. Taxonomy data store 662 can be implemented as a dictionary, a searchable database, a hierarchical data structure such as a tree, or a directed graph, for example. Graph data store 664 stores entity and attribute data and relationships between or among entities and/or attributes. For example, graph data store 664 represents entities and attributes as graph nodes and represents relationships between entities and other entities, relationships between entities and attributes, and relationships between attributes and other attributes, as edges in the graph. Graph data store 664 can be implemented using a graph database.

Embedding data store 666 stores embeddings such as attribute embedding and entity embeddings created as described herein. Entity data store 668 stores entity data and related attribute data, such as user profile data, user preferences, and/or user activity data, job postings, company or organization data, digital content items and/or features of digital content items. While shown in FIG. 6 as components of a data storage system 660, all or portions of each or any of taxonomy data store 662, graph data store 664, embedding data store 666, and/or entity data store 668 are implemented on the user system 610 in some embodiments. For example, a data store can include a volatile memory such as a form of random access memory (RAM) available on user system 610 for storing state data generated at the user system 610 or an application system 630. As another example, in some implementations, a separate, personalized version of each or any of the taxonomy data store 662, graph data store 664, embedding data store 666, and/or entity data store 668 is created for each user such that data is not shared between or among the separate, personalized versions of the data stores.

In some embodiments, data storage system 660 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 660 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 660 resides on at least one persistent and/or volatile storage device that can reside within the same local network as at least one other device of computing system 600 and/or in a network that is remote relative to at least one other device of computing system 600. Thus, although depicted as being included in computing system 600, portions of data storage system 660 can be part of computing system 600 or accessed by computing system 600 over a network, such as network 620.

While not specifically shown, it should be understood that any of user system 610, application system 630, holistic embedding generator 680, matching system 650, data storage system 660, event logging service 670, and query service 690 includes an interface embodied as computer programming code stored in computer memory that when executed causes a computing device to enable bidirectional communication with any other of user system 610, application system 630, holistic embedding generator 680, matching system 650, data storage system 660, event logging service 670, and query service 690 using a communicative coupling mechanism. Examples of communicative coupling mechanisms include network interfaces, inter-process communication (IPC) interfaces and application program interfaces (APIs).

Each of user system 610, application system 630, holistic embedding generator 680, matching system 650, data storage system 660, event logging service 670, and query service 690 is implemented using at least one computing device that is communicatively coupled to electronic communications network 620. Any of user system 610, application system 630, holistic embedding generator 680, matching system 650, data storage system 660, event logging service 670, and query service 690 can be bidirectionally communicatively coupled by network 620. User system 610 as well as other different user systems (not shown) can be bidirectionally communicatively coupled to application system 630 and/or holistic embedding generator 680.

A typical user of user system 610 can be an administrator or end user of application system 630 or holistic embedding generator 680. User system 610 is configured to communicate bidirectionally with any of user system 610, application system 630, holistic embedding generator 680, matching system 650, data storage system 660, event logging service 670, and query service 690 over network 620.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 610, application system 630, holistic embedding generator 680, matching system 650, data storage system 660, event logging service 670, and query service 690 are implemented using computer software, hardware, or software and hardware, and can include combinations of automated functionality, data structures, and digital data, which are represented schematically in the figures. User system 610, application system 630, holistic embedding generator 680, matching system 650, data storage system 660, event logging service 670, and query service 690 are shown as separate elements in FIG. 6 for ease of discussion but, except as otherwise described, the illustration is not meant to imply that separation of these elements is required. The illustrated systems, services, and data stores (or their functionality) of each of user system 610, application system 630, holistic embedding generator 680, matching system 650, data storage system 660, event logging service 670, and query service 690 can be divided over any number of physical systems, including a single physical computer system, and can communicate with each other in any appropriate manner.

Figure 8:
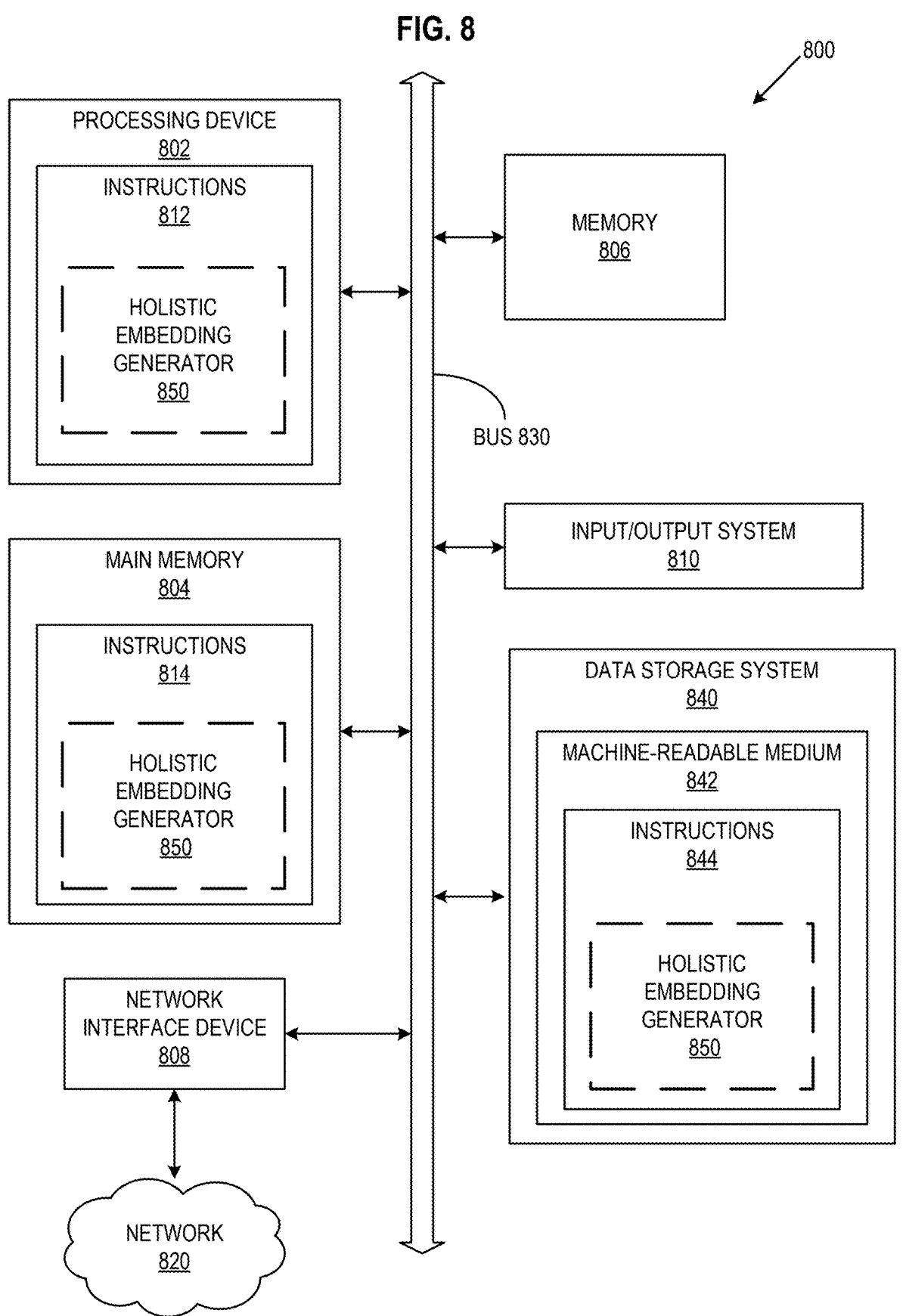
FIG. 8 is a block diagram of an example computer system including components of a holistic embedding generator in accordance with some embodiments of the present disclosure.

In the embodiment of FIG. 8, portions of holistic embedding generator 680 that may be implemented on a front end system, such as one or more user systems, and portions of holistic embedding generator 680 that may be implemented on a back end system such as one or more servers, are collectively represented as holistic embedding generator 850 for ease of discussion only. For example, portions of holistic embedding generator 680 are not required to be implemented all on the same computing device, in the same memory, or loaded into the same memory at the same time. For instance, access to portions of holistic embedding generator 680 can be limited to different, mutually exclusive sets of user systems and/or servers. For instance, in some implementations, a separate, personalized version of holistic embedding generator 680 is created for each user of the holistic embedding generator 680 such that data is not shared between or among the separate, personalized versions of the holistic embedding generator 680.

Additionally, certain portions of holistic embedding generator 680 typically may be implemented on user systems while other portions of holistic embedding generator 680 typically may be implemented on a server computer or group of servers. In some embodiments, however, one or more portions of holistic embedding generator 680 are implemented on user systems. For example, holistic embedding generator 680 is entirely implemented on user systems, e.g., client devices, in some implementations. For instance, a version of holistic embedding generator 680 can be embedded in a client device's operating system or stored at the client device and loaded into memory at execution time. Further details with regard to the operations of holistic embedding generator 850 are described herein.

FIG. 7A is a flow diagram of an example method for generating entity embeddings using a holistic embedding generator in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of a holistic embedding generator such as the holistic embedding generator 680 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

At operation 702, the processing device applies an automated attribute extraction process to a digital document associated with an entity to extract, from the digital document, a set of standardized attributes and associated attribute values. Examples of an automated attribute extraction process are described herein, for instance with reference to the attribute extractor 204 of FIG. 2.

At operation 704, the processing device retrieves, from at least one data store, a set of attribute embeddings corresponding to the set of standardized attributes and associated attribute values extracted at operation 702. Examples of attribute embedding data stores are described herein, for instance with reference to attribute embedding data store 124 of FIG. 1, attribute embedding data store 220 of FIG. 2 and embedding data store 666 of FIG. 6.

At operation 706, the processing device creates an entity embedding for the entity based on the set of attribute embeddings retrieved at operation 704. Examples of processes for creating entity embeddings based on attribute embeddings are described herein, for instance with reference to FIG. 2 and FIG. 4. In some implementations, creating the entity embedding includes sending the set of attribute embeddings to a task-specific weighting model associated with the automated matching task, where the task-specific weighting model includes weights that are trained using machine learning to indicate relationships between attributes and likelihoods of success of the automated matching task, receiving a weighted set of attribute embeddings from the task-specific weighting model, and including the weighted set of attribute embeddings in the entity embedding. In some implementations, the task-specific weighting model is trained using a distributed gradient.

At operation 708, the processing device stores the entity embedding created at operation 706 for access by an automated matching task. Examples of entity embedding data stores are described herein, for instance with reference to FIG. 1, FIG. 2, and FIG. 6.

At operation 710, at least one attribute embedding of the set of attribute embeddings retrieved at operation 704 is created based on a natural language description generated by a large language model. Examples of processes for creating attribute embeddings are described herein, for instance with reference to FIG. 1, FIG. 2, FIG. 3, and FIG. 5.

In some implementations, the attribute embedding is created by identifying a node of a graph associated with the standardized attribute and associated attribute value, using the graph, identifying at least one neighboring node that shares at least one edge with the node, and including content associated with the at least one neighboring node in the input to the task-agnostic LLM. In some implementations, a taxonomy is used to map the standardized attribute and associated attribute value to an attribute identifier, and the attribute identifier obtained via the taxonomy is used to identify the node of the graph.

In some implementations, the attribute embedding is created by configuring a task-specific instruction specific to the matching task, and including the task-specific instruction in the input to the task-agnostic LLM.

In some implementations, the processing device sends the natural language description of the standardized attribute and associated attribute value to a set of embedding generators each trained according to a different training objective, receives a set of embeddings of the natural language description from the set of embedding generators, and stacks the plurality of embeddings of the natural language description in a single matrix. In some implementations, the automated matching task uses the entity embedding to at least one of: identify at least one job posting that matches the entity, where the entity includes job seeker data; or find at least one job candidate profile that matches the entity, where the entity includes a job posting.

The examples shown in FIG. 7A and the accompanying description, above are provided for illustration purposes. This disclosure is not limited to the described examples.

FIG. 7B is a flow diagram of an example method for generating attribute embeddings using one or more attribute embedding generators in accordance with some embodiments of the present disclosure.

The method 750 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of a holistic embedding generator such as the holistic embedding generator 680 of FIG.

6. Although shown in a particular sequence or order, unless otherwise specified, the order of the processes can be modified. Thus, the illustrated embodiments should be understood only as examples, and the illustrated processes can be performed in a different order, and some processes can be performed concurrently. Additionally, at least one process can be omitted in various embodiments. Thus, not all processes are required in every embodiment. Other process flows are possible.

At operation 752, the processing device sends input including a standardized attribute and an associated attribute value to a task-agnostic large language model (LLM). Example uses of task agnostic LLMs are described herein, for instance with reference to FIG. 3 and FIG. 5.

At operation 754, the processing device receives, from the task-agnostic LLM of operation 752, a natural language description of the standardized attribute and associated attribute value included as input via operation 752. Examples of task agnostic LLMs are described herein, for instance with reference to FIG. 3 and FIG. 5.

At operation 756, the processing device sends the natural language description of the standardized attribute and associated attribute value, received from the task-agnostic LLM via operation 754, to at least one attribute embedding generator. Examples of attribute embedding generation are described herein, for instance with reference to FIG. 3 and FIG. 5.

At operation 757, the processing device generates at least one variant of an embedding of an extracted attribute and create a matrix of embeddings based on the at least one variant. Examples of embedding generation including stacking a matric of embeddings are described herein, for instance with reference to FIG. 3, FIG. 4, and FIG. 5.

At operation 758, the processing device receives, from the at least one attribute embedding generator of operation 756, at least one attribute embedding of the natural language description generated and output by the task-agnostic LLM. Examples of attribute embeddings are described herein, for instance with reference to FIG. 2, FIG. 3, and FIG. 5.

At operation 760, the processing device provides the at least one holistic embedding to at least one matching task and/or other downstream task, application, process, system, component, or model. For example, the at least one holistic embedding includes a stacked matrix of embeddings that is provided or otherwise made accessible to one or more matching tasks.

The examples shown in FIG. 7B and the accompanying description, above are provided for illustration purposes. This disclosure is not limited to the described examples.

FIG. 8 is a block diagram of an example computer system including components of a holistic embedding generator in accordance with some embodiments of the present disclosure.

In FIG. 8, an example machine of a computer system 800 is shown, within which a set of instructions for causing the machine to perform any of the methodologies discussed herein can be executed. In some embodiments, the computer system 800 can correspond to a component of a networked computer system (e.g., as a component of the computing system 100 of FIG. 1 or the computer system 600 of FIG. 6) that includes, is coupled to, or utilizes a machine to execute an operating system to perform operations corresponding to one or more components of the holistic embedding generator of FIG. 1 or the holistic embedding generator 680 of FIG. 6. For example, computer system 800 corresponds to a portion of computing system 600 when the computing system is executing a portion of holistic embedding generator or holistic embedding generator 680.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 803 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In some embodiments of FIG. 8, holistic embedding generator 850 represents portions of holistic embedding generator 680 while the computer system 800 is executing those portions of holistic embedding generator 680. Instructions 812 include portions of holistic embedding generator 850 when those portions of the holistic embedding generator 850 are being executed by processing device 802. Thus, the holistic embedding generator 850 is shown in dashed lines as part of instructions 812 to illustrate that, at times, portions of the holistic embedding generator 850 are executed by processing device 802. For example, when at least some portion of the holistic embedding generator 850 is embodied in instructions to cause processing device 802 to perform the method(s) described herein, some of those instructions can be read into processing device 802 (e.g., into an internal cache or other memory) from main memory 804 and/or data storage system 840. However, it is not required that all of the holistic embedding generator 850 be included in instructions 812 at the same time and portions of the holistic embedding generator 850 are stored in at least one other component of computer system 800 at other times, e.g., when at least one portion of the holistic embedding generator 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, haptic information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media. In one embodiment, the instructions 844 include instructions to implement functionality corresponding to a holistic embedding generator 850 (e.g., the holistic embedding generator 106 of FIG. 1 or holistic embedding generator 680 of FIG. 6).

Dashed lines are used in FIG. 8 to indicate that it is not required that the holistic embedding generator be embodied entirely in instructions 812, 814, and 844 at the same time. In one example, portions of the holistic embedding generator are embodied in instructions 814, which are read into main memory 804 as instructions 814, and portions of instructions 812 are read into processing device 802 as instructions 812 for execution. In another example, some portions of the holistic embedding generator are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 8 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 600, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Illustrative examples of the technologies disclosed herein are provided below. An embodiment of the technologies may include any of the examples described herein, or any combination of any of the examples described herein, or any combination of any portions of the examples described herein.

In some aspects, the techniques described herein relate to a method for creating at least one attribute embedding, the method including: sending input including a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

In some aspects, the techniques described herein relate to a method, further including: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

In some aspects, the techniques described herein relate to a method, wherein creating the entity embedding includes: sending the set of attribute embeddings to a task-specific weighting model associated with an automated matching task, wherein the task-specific weighting model includes weights that are trained using machine learning to indicate relationships between attributes and likelihoods of success of the automated matching task; receiving a weighted set of attribute embeddings from the task-specific weighting model; and including the weighted set of attribute embeddings in the entity embedding.

In some aspects, the techniques described herein relate to a method, wherein the task-specific weighting model is trained using a distributed gradient.

In some aspects, the techniques described herein relate to a method, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

In some aspects, the techniques described herein relate to a method, further including: using a taxonomy, mapping the standardized attribute and associated attribute value to an attribute identifier; and using the attribute identifier to identify the node of the graph.

In some aspects, the techniques described herein relate to a method, wherein the attribute embedding is further created by: configuring a task-specific instruction specific to an automated matching task; and including the task-specific instruction in input to the generative large language model.

In some aspects, the techniques described herein relate to a method, further including: sending the natural language description of a standardized attribute and associated attribute value to a plurality of embedding generators each trained according to a different training objective; receiving a plurality of embeddings of the natural language description from the plurality of embedding generators; and stacking the plurality of embeddings of the natural language description in a single matrix.

In some aspects, the techniques described herein relate to a method, wherein an automated matching task uses the entity embedding to at least one of: identify at least one job posting that matches the entity, wherein the entity includes a job seeker; or identify at least one job candidate that matches the entity, wherein the entity includes a job posting; or identify at least one digital content item that matches the entity, wherein the entity includes a user of an application system.

In some aspects, the techniques described herein relate to a system including: at least one processor; and at least one memory coupled to the at least one processor, wherein the at least one memory includes at least one instruction that, when executed by the at least one processor, cause the at least one processor to perform at least one operation including: sending input including a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

In some aspects, the techniques described herein relate to a system, wherein the at least one instruction, when executed by the at least one processor, causes the at least one processor to perform at least one operation including further including: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

In some aspects, the techniques described herein relate to a system, wherein creating the entity embedding includes: sending the set of attribute embeddings to a task-specific weighting model associated with an automated matching task, wherein the task-specific weighting model includes weights that are trained using machine learning to indicate relationships between attributes and likelihoods of success of the automated matching task; receiving a weighted set of attribute embeddings from the task-specific weighting model; and including the weighted set of attribute embeddings in the entity embedding.

In some aspects, the techniques described herein relate to a system, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

In some aspects, the techniques described herein relate to a system, wherein the at least one instruction, when executed by the at least one processor, causes the at least one processor to perform at least one operation further including: using a taxonomy, mapping the standardized attribute and associated attribute value to an attribute identifier; and using the attribute identifier to identify the node of the graph.

In some aspects, the techniques described herein relate to a system, wherein the at least one instruction, when executed by the at least one processor, causes the at least one processor to perform at least one operation including further including: sending the natural language description of a standardized attribute and associated attribute value to a plurality of embedding generators each trained according to a different training objective; receiving a plurality of embeddings of the natural language description from the plurality of embedding generators; and stacking the plurality of embeddings of the natural language description in a single matrix.

In some aspects, the techniques described herein relate to at least one non-transitory machine-readable storage medium including at least one instruction that, when executed by at least one processor, causes the at least one processor to perform at least one operation including: sending input including a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

In some aspects, the techniques described herein relate to an at least one non-transitory machine-readable storage medium, wherein the at least one instruction, when executed by the at least one processor, causes the at least one processor to perform at least one operation including further including: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

In some aspects, the techniques described herein relate to an at least one non-transitory machine-readable storage medium, wherein creating the entity embedding includes: sending the set of attribute embeddings to a task-specific weighting model associated with an automated matching task, wherein the task-specific weighting model includes weights that are trained using machine learning to indicate relationships between attributes and likelihoods of success of the automated matching task; receiving a weighted set of attribute embeddings from the task-specific weighting model; and including the weighted set of attribute embeddings in the entity embedding.

In some aspects, the techniques described herein relate to an at least one non-transitory machine-readable storage medium, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

In some aspects, the techniques described herein relate to an at least one non-transitory machine-readable storage medium, wherein the at least one instruction, when executed by the at least one processor, causes the at least one processor to perform at least one operation further including: using a taxonomy, mapping the standardized attribute and associated attribute value to an attribute identifier; and using the attribute identifier to identify the node of the graph.

Clause 1. A method for creating at least one attribute embedding, the method comprising: sending input comprising a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

Clause 2. The method of clause 1, further comprising: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

Clause 3. The method of clause 2, wherein creating the entity embedding comprises: sending the set of attribute embeddings to a task-specific weighting model associated with an automated matching task, wherein the task-specific weighting model comprises weights that are trained using machine learning to indicate relationships between attributes and likelihoods of success of the automated matching task; receiving a weighted set of attribute embeddings from the task-specific weighting model; and including the weighted set of attribute embeddings in the entity embedding.

Clause 4. The method of clause 3, wherein the task-specific weighting model is trained using a distributed gradient.

Clause 5. The method of any of clauses 1-4, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

Clause 6. The method of clause 5, further comprising: using a taxonomy, mapping the standardized attribute and associated attribute value to an attribute identifier; and using the attribute identifier to identify the node of the graph.

Clause 7. The method of any of clauses 1-6, wherein the attribute embedding is further created by: configuring a task-specific instruction specific to an automated matching task; and including the task-specific instruction in input to the generative large language model.

Clause 8. The method of any of clauses 1-7, further comprising: sending the natural language description of a standardized attribute and associated attribute value to a plurality of embedding generators each trained according to a different training objective; receiving a plurality of embeddings of the natural language description from the plurality of embedding generators; and stacking the plurality of embeddings of the natural language description in a single matrix.

Clause 9. The method of clause 2, wherein an automated matching task uses the entity embedding to at least one of: identify at least one job posting that matches the entity, wherein the entity comprises a job seeker; or identify at least one job candidate that matches the entity, wherein the entity comprises a job posting; or identify at least one digital content item that matches the entity, wherein the entity comprises a user of an application system.

Clause 10. A system comprising: at least one processor; and at least one memory coupled to the at least one processor, wherein the at least one memory comprises at least one instruction that, when executed by the at least one processor, cause the at least one processor to perform at least one operation comprising: sending input comprising a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

Clause 11. The system of clause 10, wherein the at least one instruction, when executed by the at least one processor, causes the at least one processor to perform at least one operation comprising further comprising: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

Clause 12. The system of clause 10 or clause 11, wherein creating the entity embedding comprises: sending the set of attribute embeddings to a task-specific weighting model associated with an automated matching task, wherein the task-specific weighting model comprises weights that are trained using machine learning to indicate relationships between attributes and likelihoods of success of the automated matching task; receiving a weighted set of attribute embeddings from the task-specific weighting model; and including the weighted set of attribute embeddings in the entity embedding.

Clause 13. The system of any of clauses 10-12, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

Clause 14. The system of clause 13, wherein the at least one instruction, when executed by the at least one processor, causes the at least one processor to perform at least one operation further comprising: using a taxonomy, mapping the standardized attribute and associated attribute value to an attribute identifier; and using the attribute identifier to identify the node of the graph.

Clause 15. The system of any of clauses 10-14, wherein the at least one instruction, when executed by the at least one processor, causes the at least one processor to perform at least one operation comprising further comprising: sending the natural language description of a standardized attribute and associated attribute value to a plurality of embedding generators each trained according to a different training objective; receiving a plurality of embeddings of the natural language description from the plurality of embedding generators; and stacking the plurality of embeddings of the natural language description in a single matrix.

Clause 16. At least one non-transitory machine-readable storage medium comprising at least one instruction that, when executed by at least one processor, causes the at least one processor to perform at least one operation comprising: sending input comprising a standardized attribute and an associated attribute value to a task-agnostic generative large language model (LLM); receiving, from the task-agnostic generative LLM, a natural language description of the standardized attribute and associated attribute value; sending the natural language description of the standardized attribute and associated attribute value to at least one embedding generator; and receiving, from the at least one embedding generator, at least one embedding of the natural language description.

Clause 17. The at least one non-transitory machine-readable storage medium of clause 16, wherein the at least one instruction, when executed by the at least one processor, causes the at least one processor to perform at least one operation comprising further comprising: applying an automated attribute extraction process to a digital document associated with an entity to extract, from the digital document, a set of standardized attributes and associated attribute values; retrieving, from at least one data store, a set of attribute embeddings corresponding to the extracted set of standardized attributes and associated attribute values, wherein at least one attribute embedding of the set of attribute embeddings is created based on the natural language description; creating an entity embedding for the entity based on the set of attribute embeddings; and storing the entity embedding.

Clause 18. The at least one non-transitory machine-readable storage medium of clause 17, wherein creating the entity embedding comprises: sending the set of attribute embeddings to a task-specific weighting model associated with an automated matching task, wherein the task-specific weighting model comprises weights that are trained using machine learning to indicate relationships between attributes and likelihoods of success of the automated matching task; receiving a weighted set of attribute embeddings from the task-specific weighting model; and including the weighted set of attribute embeddings in the entity embedding.

Clause 19. The at least one non-transitory machine-readable storage medium of any of clauses 16-18, wherein the attribute embedding is further created by: identifying a node of a graph associated with a standardized attribute and associated attribute value; using the graph, identifying at least one neighboring node that shares at least one edge with the node; and including data associated with the at least one neighboring node in input to the generative large language model.

Clause 20. The at least one non-transitory machine-readable storage medium of clause 19, wherein the at least one instruction, when executed by the at least one processor, causes the at least one processor to perform at least one operation further comprising: using a taxonomy, mapping the standardized attribute and associated attribute value to an attribute identifier; and using the attribute identifier to identify the node of the graph.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for creating at least one attribute embedding, the method comprising:
   sending input comprising a standardized attribute and an associated attribute value to a task-agnostic generative large language model (LLM);
   receiving, from the task-agnostic generative LLM, a natural language description of the standardized attribute and associated attribute value;
   sending the natural language description of the standardized attribute and associated attribute value to at least one embedding generator; and
   receiving, from the at least one embedding generator, at least one embedding of the natural language description.

2. The method of claim 1, further comprising:
   applying an automated attribute extraction process to a digital document associated with an entity to extract, from the digital document, a set of standardized attributes and associated attribute values;
   retrieving, from at least one data store, a set of attribute embeddings corresponding to the extracted set of standardized attributes and associated attribute values, wherein at least one attribute embedding of the set of attribute embeddings is created based on the natural language description;
   creating an entity embedding for the entity based on the set of attribute embeddings; and
   storing the entity embedding.

3. The method of claim 2, wherein creating the entity embedding comprises:
   sending the set of attribute embeddings to a task-specific weighting model associated with an automated matching task, wherein the task-specific weighting model comprises weights that are trained using machine learning to indicate relationships between attributes and likelihoods of success of the automated matching task; receiving a weighted set of attribute embeddings from the task-specific weighting model; and including the weighted set of attribute embeddings in the entity embedding.

4. The method of claim 3, wherein the task-specific weighting model is trained using a distributed gradient.

5. The method of claim 1, wherein the attribute embedding is further created by:
   identifying a node of a graph associated with a standardized attribute and associated attribute value;
   using the graph, identifying at least one neighboring node that shares at least one edge with the node; and
   including data associated with the at least one neighboring node in input to the generative large language model.

6. The method of claim 5, further comprising:
   using a taxonomy, mapping the standardized attribute and associated attribute value to an attribute identifier; and
   using the attribute identifier to identify the node of the graph.

7. The method of claim 1, wherein the attribute embedding is further created by:
   configuring a task-specific instruction specific to an automated matching task; and
   including the task-specific instruction in input to the generative large language model.

8. The method of claim 1, further comprising:
   sending the natural language description of a standardized attribute and associated attribute value to a plurality of embedding generators each trained according to a different training objective;
   receiving a plurality of embeddings of the natural language description from the plurality of embedding generators; and
   stacking the plurality of embeddings of the natural language description in a single matrix.

9. The method of claim 2, wherein an automated matching task uses the entity embedding to at least one of:
   identify at least one job posting that matches the entity, wherein the entity comprises a job seeker; or
   identify at least one job candidate that matches the entity, wherein the entity comprises a job posting; or
   identify at least one digital content item that matches the entity, wherein the entity comprises a user of an application system.

10. A system comprising:
   at least one processor; and
   at least one memory coupled to the at least one processor, wherein the at least one memory comprises at least one instruction that, when executed by the at least one processor, cause the at least one processor to perform at least one operation comprising:
   sending input comprising a standardized attribute and an associated attribute value to a task-agnostic generative large language model (LLM);
   receiving, from the task-agnostic generative LLM, a natural language description of the standardized attribute and associated attribute value;
   sending the natural language description of the standardized attribute and associated attribute value to at least one embedding generator; and
   receiving, from the at least one embedding generator, at least one embedding of the natural language description.

11. The system of claim 10, wherein the at least one instruction, when executed by the at least one processor, causes the at least one processor to perform at least one operation comprising further comprising:

applying an automated attribute extraction process to a digital document associated with an entity to extract, from the digital document, a set of standardized attributes and associated attribute values;

retrieving, from at least one data store, a set of attribute embeddings corresponding to the extracted set of standardized attributes and associated attribute values, wherein at least one attribute embedding of the set of attribute embeddings is created based on the natural language description;

creating an entity embedding for the entity based on the set of attribute embeddings; and storing the entity embedding.

12. The system of claim 11, wherein creating the entity embedding comprises:

sending the set of attribute embeddings to a task-specific weighting model associated with an automated matching task, wherein the task-specific weighting model comprises weights that are trained using machine learning to indicate relationships between attributes and likelihoods of success of the automated matching task;

receiving a weighted set of attribute embeddings from the task-specific weighting model; and including the weighted set of attribute embeddings in the entity embedding.

13. The system of claim 10, wherein the attribute embedding is further created by:

identifying a node of a graph associated with a standardized attribute and associated attribute value;

using the graph, identifying at least one neighboring node that shares at least one edge with the node; and including data associated with the at least one neighboring node in input to the generative large language model.

14. The system of claim 13, wherein the at least one instruction, when executed by the at least one processor, causes the at least one processor to perform at least one operation further comprising:

using a taxonomy, mapping the standardized attribute and associated attribute value to an attribute identifier; and using the attribute identifier to identify the node of the graph.

15. The system of claim 10, wherein the at least one instruction, when executed by the at least one processor, causes the at least one processor to perform at least one operation comprising further comprising:

sending the natural language description of a standardized attribute and associated attribute value to a plurality of embedding generators each trained according to a different training objective;

receiving a plurality of embeddings of the natural language description from the plurality of embedding generators; and stacking the plurality of embeddings of the natural language description in a single matrix.

16. At least one non-transitory machine-readable storage medium comprising at least one instruction that, when executed by at least one processor, causes the at least one processor to perform at least one operation comprising:

sending input comprising a standardized attribute and an associated attribute value to a task-agnostic generative large language model (LLM);

receiving, from the task-agnostic generative LLM, a natural language description of the standardized attribute and associated attribute value;

sending the natural language description of the standardized attribute and associated attribute value to at least one embedding generator; and receiving, from the at least one embedding generator, at least one embedding of the natural language description.

17. The at least one non-transitory machine-readable storage medium of claim 16, wherein the at least one instruction, when executed by the at least one processor, causes the at least one processor to perform at least one operation comprising further comprising:

applying an automated attribute extraction process to a digital document associated with an entity to extract, from the digital document, a set of standardized attributes and associated attribute values;

retrieving, from at least one data store, a set of attribute embeddings corresponding to the extracted set of standardized attributes and associated attribute values, wherein at least one attribute embedding of the set of attribute embeddings is created based on the natural language description;

creating an entity embedding for the entity based on the set of attribute embeddings; and storing the entity embedding.

18. The at least one non-transitory machine-readable storage medium of claim 17, wherein creating the entity embedding comprises:

sending the set of attribute embeddings to a task-specific weighting model associated with an automated matching task, wherein the task-specific weighting model comprises weights that are trained using machine learning to indicate relationships between attributes and likelihoods of success of the automated matching task;

receiving a weighted set of attribute embeddings from the task-specific weighting model; and including the weighted set of attribute embeddings in the entity embedding.

19. The at least one non-transitory machine-readable storage medium of claim 16, wherein the attribute embedding is further created by:

identifying a node of a graph associated with a standardized attribute and associated attribute value;

using the graph, identifying at least one neighboring node that shares at least one edge with the node; and including data associated with the at least one neighboring node in input to the generative large language model.

20. The at least one non-transitory machine-readable storage medium of claim 19, wherein the at least one instruction, when executed by the at least one processor, causes the at least one processor to perform at least one operation further comprising:

using a taxonomy, mapping the standardized attribute and associated attribute value to an attribute identifier; and using the attribute identifier to identify the node of the graph.

* * * * *